United States Patent
Karaki et al.

(10) Patent No.: US 12,238,711 B2
(45) Date of Patent: Feb. 25, 2025

(54) SUPPORT OF ENHANCED DYNAMIC CODEBOOK WITH DIFFERENT DCI FORMATS

(71) Applicant: Telefonaktiebolaget LM Ericsson (publ), Stockholm (SE)

(72) Inventors: Reem Karaki, Aachen (DE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 17/763,894

(22) PCT Filed: Sep. 25, 2020

(86) PCT No.: PCT/EP2020/076896
§ 371 (c)(1),
(2) Date: Mar. 25, 2022

(87) PCT Pub. No.: WO2021/063828
PCT Pub. Date: Apr. 8, 2021

(65) Prior Publication Data
US 2022/0361211 A1    Nov. 10, 2022

Related U.S. Application Data

(60) Provisional application No. 62/908,109, filed on Sep. 30, 2019.

(51) Int. Cl.
*H04W 72/04* (2023.01)
*H04L 1/1812* (2023.01)
(Continued)

(52) U.S. Cl.
CPC ....... *H04W 72/1273* (2013.01); *H04L 1/1812* (2013.01); *H04L 1/1887* (2013.01); *H04W 72/23* (2023.01)

(58) Field of Classification Search
CPC ............ H04W 72/1273; H04W 72/23; H04W 1/1812; H04W 1/1887; H04W 1/1607;
(Continued)

(56) References Cited

U.S. PATENT DOCUMENTS

2022/0014314 A1* 1/2022 Wang .................. H04L 1/08
2022/0353019 A1* 11/2022 Li .................. H04L 1/1685

OTHER PUBLICATIONS

Samsung (HARQ enhancements for NR-U, R1-1908467, Aug. 26-30, 2019) (Year: 2019).*

(Continued)

*Primary Examiner* — Maharishi V Khirodhar
(74) *Attorney, Agent, or Firm* — Sage Patent Group

(57) ABSTRACT

Systems and methods are disclosed herein for supporting enhanced dynamic codebook Hybrid Automatic Repeat Request (HARQ) feedback. In one embodiment, a method performed by a wireless communication device comprises receiving, from a base station, downlink control information (DCI) in accordance with a fallback DCI format. The DCI comprises downlink scheduling information that indicates downlink resources allocated for a downlink data channel transmission to the wireless communication device. The fallback DCI format does not include an explicit indication of an identifier of a downlink data channel group of the downlink data channel transmission. The method further comprises attempting to receive and decode the transmission and determining a downlink data channel group for the transmission based on the DCI. The method further comprises generating a dynamic codebook HARQ feedback for the downlink data channel group comprising HARQ feedback for the transmission and transmitting the dynamic codebook HARQ feedback to the base station.

11 Claims, 10 Drawing Sheets

(51) Int. Cl.
*H04L 1/1867* (2023.01)
*H04W 72/1273* (2023.01)
*H04W 72/23* (2023.01)
*H04W 76/00* (2018.01)
*H04W 88/08* (2009.01)

(58) Field of Classification Search
CPC ............ H04W 1/1685; H04W 1/1854; H04W 1/1896
USPC .......................................................... 370/329
See application file for complete search history.

(56) References Cited

OTHER PUBLICATIONS

Vivo (R1-1908142, "Discussion on HARQ operation for NR-U", Aug. 26-30, 2019), (Year: 2019).*
Intel corporation (R1-1908626, "Enhancements to HARQ for NR-unlicensed", Aug. 26-30, 2019), (Year: 2019).*
Lenovo (R1-1908723, "Harq enhancements for NR-U", Aug. 26-30, 2019), (Year: 2019).*
ZTE (R1-1908207, "Discussion on scheduling and HARQ for NR-U", Aug. 26-30, 2019), (Year: 2019).*
Huawei (R1-1903930, "HARQ enhancements in NR Unlicensed", Apr. 8-12, 2019) (Year: 2019).*
Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.
Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.
Samsung, "R1-1908467: HARQ enhancements for NR-U," 3GPP TSG RAN WG1 #98, Aug. 26-30, 2019, Prague, Czech Republic, 8 pages.
Wilus Inc., "R1-1802938: Consideration on dynamic HARQ-ACK codebook," 3GPP TSG RAN WG1 Meeting #92, Feb. 26-Mar. 2, 2018, Athens, Greece, 7 pages.
Wilus Inc., "R1-1805245: Consideration on HARQ-ACK codebook construction," 3GPP TSG RAN WG1 Meeting #92bis, Apr. 16-20, 2018, Sanya, China, 5 pages.
International Search Report and Written Opinion for International Patent Application No. PCT/EP2020/076896, mailed Dec. 22, 2020, 12 pages.

* cited by examiner

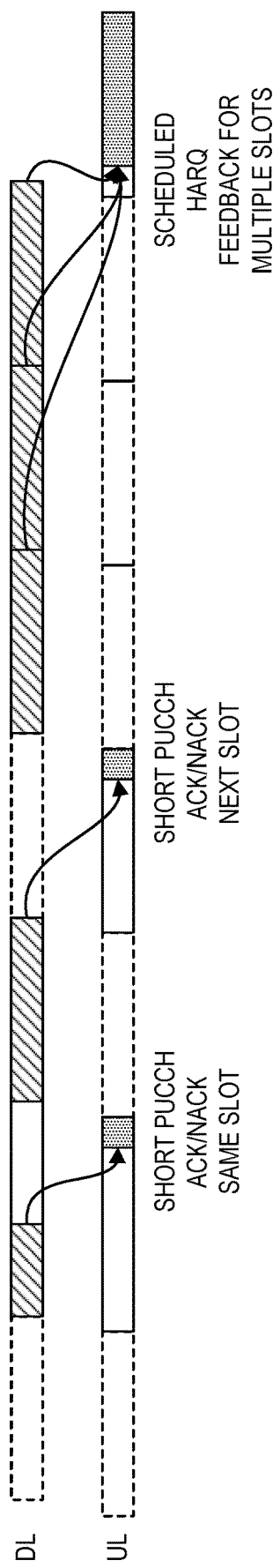
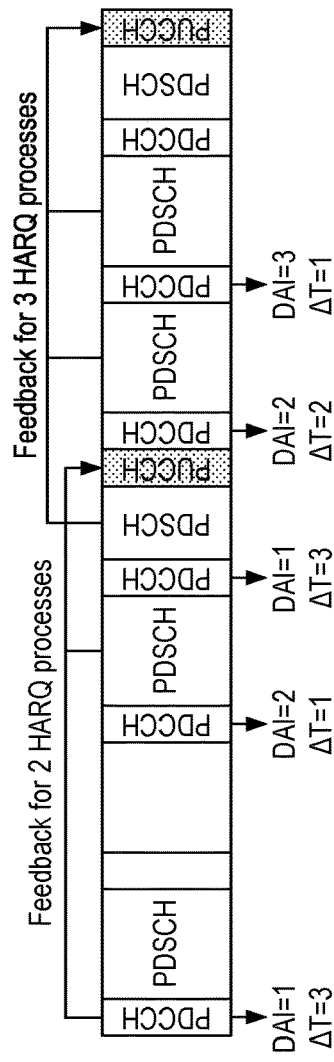
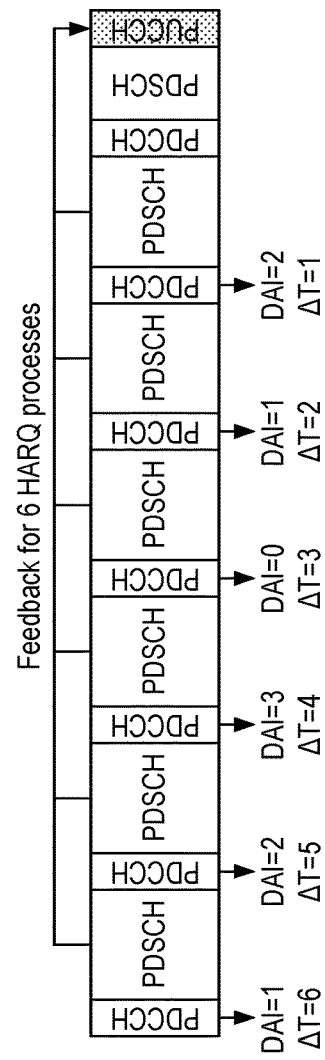

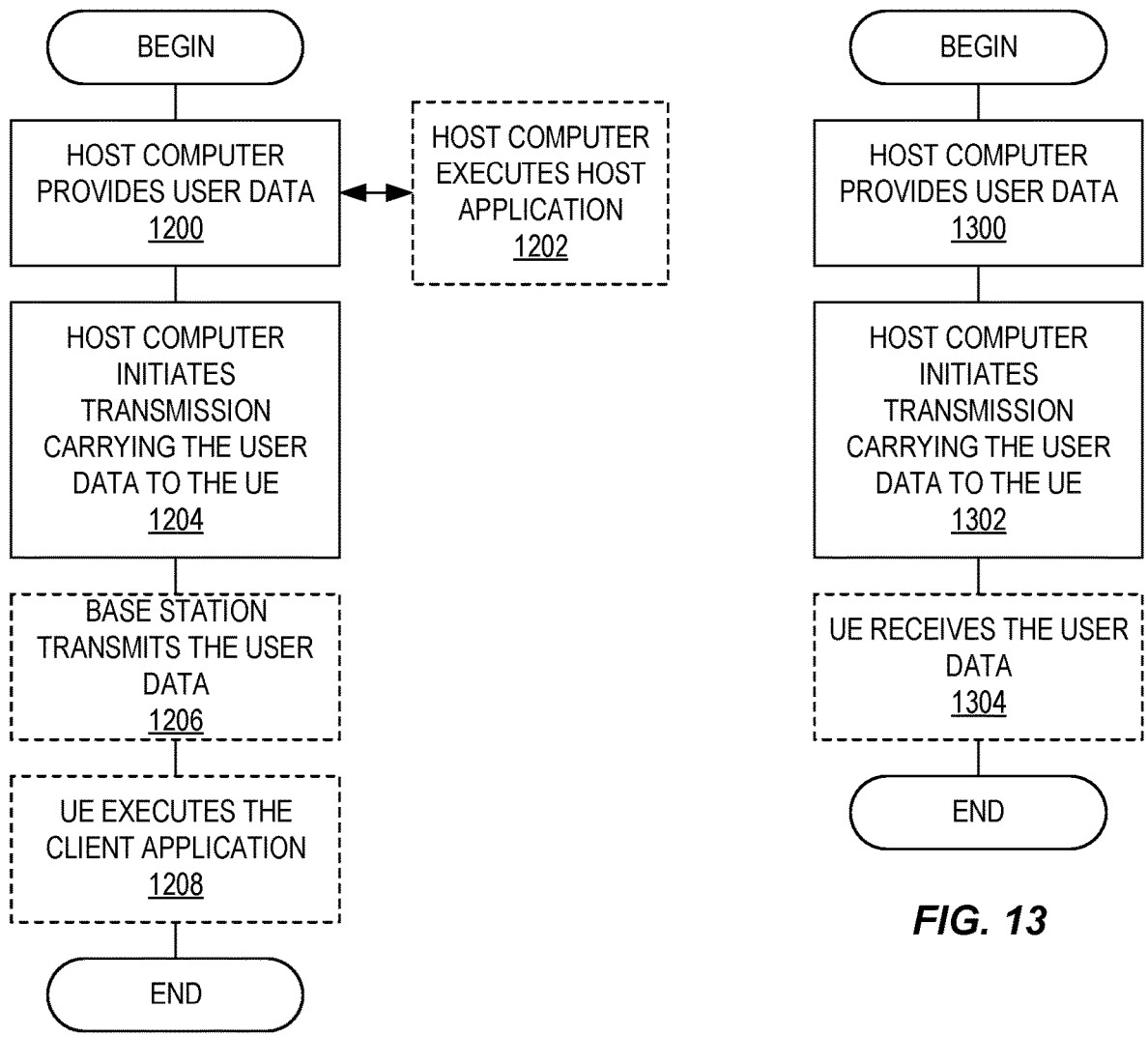

SUPPORT OF ENHANCED DYNAMIC CODEBOOK WITH DIFFERENT DCI FORMATS

RELATED APPLICATIONS

This application is a 35 U.S.C. § 371 national phase filing of International Application No. PCT/EP2020/076896, filed Sep. 25, 2020, which claims the benefit of provisional patent application Ser. No. 62/908,109, filed Sep. 30, 2019, the disclosures of which are hereby incorporated herein by reference in its entirety their entireties.

TECHNICAL FIELD

The present disclosure relates to enhanced dynamic Hybrid Automatic Repeat Request (HARQ) in a cellular communications system.

BACKGROUND

Third Generation Partnership Project (3GPP) New Radio (NR) provides flexibility in Hybrid Automatic Repeat Request (HARQ) feedback timing to account for dynamic Timing Division Duplexing (TDD) and also possibly combine several HARQ feedbacks for both lower overhead and higher reliability. FIG. 1 shows an example NR HARQ feedback flexible timing. The slot timing, denoted as K1, between downlink (DL) data transmission and acknowledgement is determined based on a 3-bit field in the Downlink Control Information (DCI). Radio Resource Control (RRC) configures the set of eight (8) values to be indexed by K1, where the possible value range is $\{0, 1, \ldots, 15\}$.

NR provides the flexibility to include aggregate feedback corresponding to multiple HARQ processes in one Physical Uplink Control Channel (PUCCH)/Uplink Control Information (UCI) transmission by means of semi-static and dynamic HARQ codebook. In regard to a semi-static HARQ codebook, the HARQ codebook size in time (i.e., the size of the feedback corresponding to reception occasions for DL transmissions) is determined based on the configured set of HARQ-ACK timings K1, Physical Downlink Control Channel (PDCCH) monitoring occasions, and semi-static configured TDD pattern. For each slot, the User Equipment (UE) needs to report a HARQ feedback bitmap of fixed size according to its Carrier Aggregation (CA) and Transport Block (TB)/Codeblock Group (CBG) configuration. In this example, the fixed size of the HARQ feedback bitmap is 7 bits. Those TB/CBGs which are not received are set to NACK.

In regard to a dynamic HARQ codebook, the dynamic HARQ codeblock provides a possibility to dynamically determine the set of HARQ processes for which the HARQ feedback should be reported. The DCI includes:
  Downlink Assignment Indicator (DAI): The DAI indicates the number of HARQ processes that should reported; and
  Physical Downlink Shared Channel (PDSCH) to HARQ-ACK timing that specifies the time resource in which the NR base station (gNB) is expecting the HARQ feedback.

In regard to DAI computation for dynamic HARQ codebook, the UE refers to the DAI value to calculate the dynamic codebook size. For every PDSCH transmission, the DAI value in the DCI is incremented. The DAI in the DL scheduling DCI should be stepped by one as compared to the immediately preceding DL scheduling DCI. If not, it is an indication that PDSCH transmission(s) has been missed. The difference between the two received DAI values at the UE in current and earlier DCI indicates how many PDSCH transmissions were missed.

DAI indicates the number of HARQ processes that should be reported. However, the DAI value in NR Release 15 is only 2-bits representing four possible values 0, 1, 2, 3 and, after reaching the highest DAI value (i.e. 3), the DAI is wrapped around and started again from the smallest value. This is shown in FIG. 2.

Transmissions on unlicensed bands are subject to a Listen Before Talk (LBT) procedure. Therefore, there is uncertainty because a transmission may nor may not occur depending on the LBT outcome. If HARQ feedback transmission on UCI is subject to LBT, there is a risk that the UE fails to perform the transmission depending on the LBT outcome. Due to the one-to-one mapping between PDSCH and corresponding feedback in the time domain, if the UE fails to transmit the feedback in the predefined time location, the gNB will have to assume a NACK and retransmit all the corresponding PDSCHs. The latter can be considered as an inefficient utilization of the band causing unnecessary increase in the channel contention.

Even if the UE successfully transmits the HARQ feedback, there are chances that the gNB may not be able to detect it. From the gNB perspective, the gNB is unable to distinguish between failed LBT transmissions and missed UCI transmissions. Due to the one-to-one mapping between PDSCH and corresponding feedback in the time domain, if the gNB fails to detect the feedback in the predefined time location, the gNB will have to assume NACK and retransmit all the corresponding PDSCHs.

To overcome these limitations, 3GPP has agreed to support mechanisms to allow retransmission of the HARQ feedback. In particular, the following was agreed in RAN1 #96bis.:

Agreement (RAN1 #96bis)
Restrict further discussion on HARQ codebook to the following:
  For dynamic HARQ codebook:
    PDSCH grouping by explicitly signalling a group index in DCI scheduling the PDSCH
    gNB can request HARQ-ACK feedback in the same PUCCH for all PDSCHs in the same group
    Option 1:
      One PUCCH can carry HARQ-ACK feedback for one or more PDSCH groups
      DCI can request HARQ-ACK feedback for one or more PDSCH groups
      FFS one of the two options below
        C-DAI/T-DAI can be accumulated across multiple PDSCH groups for which feedback is requested in the same PUCCH
        C-DAI/T-DAI is accumulated only within one PDSCH group
      FFS: New ACK-Feedback Group Indicator for each PDSCH Group
      The number of HARQ-ACK bits for one PDSCH group is constant between a first HARQ-ACK feedback transmission and a HARQ-ACK feedback re-transmission, i.e. the PDSCH group cannot be enlarged after the first feedback transmission Option 2:
  One PUCCH can carry HARQ-ACK feedback for a single PDSCH group
    FFS: Feedback for more than one PDSCH group
  DCI can request HARQ-ACK feedback for a single PDSCH group
    FFS: Requests for more than one PDSCH group
  C-DAI/T-DAI is accumulated within one PDSCH group
  A reset indicator signals new HARQ-ACK feedback for a PDSCH group
  The number of HARQ-ACK bits for one PDSCH group may not be constant between a first HARQ-ACK feedback transmission and a HARQ-ACK feedback re-transmission
Semi-static codebook. Options FFS.
If request/trigger for one-shot group HARQ ACK feedback for all configured HARQ processes is introduced (at least for non-CBG HARQ), select one or more of the following candidate schemes:
  The request is carried in a UE-specific DCI carrying a PUSCH grant
  The request is carried in a UE-specific DCI carrying a PDSCH assignment
  The request is carried in a UE-specific DCI not scheduling PDSCH nor PUSCH
  The request is carried in a UE-common DCI
  The request can be used for UE configured with dynamic or semi-static HARQ codebook
Note: The discussion on preconfigured/pre-indicated multiple opportunities in frequency domain in different LBT subbands is a separate discussion.
Agreement:
  For operation with dynamic HARQ codebook (type-2 codebook):
  PDSCH grouping by explicitly signalling a group index in DCI scheduling the PDSCH
  For any PDSCH scheduled with numerical or non-numerical value of K1
  The number of HARQ-ACK bits for one PDSCH group can change between successive requests for HARQ-ACK feedback for the same PDSCH group
  HARQ-ACK feedback for all PDSCHs in the same group is carried in the same PUCCH
  One DCI can request HARQ-ACK feedback for one or more PDSCH groups in the same PUCCH
  C-DAI/T-DAI is accumulated only within each PDSCH group
  FFS: Choose between the following options:
  T-DAI is included only for the scheduled group
  T-DAI is included for each group
  New ACK-Feedback Group Indicator for each PDSCH Group operates as a toggle bit
  Maximum number of PDSCH groups: 2 (FFS: maximum number of groups 4 and maximum number of groups for which feedback is requested in the same PUCCH)
  A UE can signal support of this feature as part of capability signaling

SUMMARY

Systems and methods are disclosed herein for supporting enhanced dynamic codebook Hybrid Automatic Repeat Request (HARQ) feedback. In one embodiment, a method performed by a wireless communication device for dynamic codebook HARQ comprises receiving, from a base station, a downlink control information (DCI) in accordance with a fallback DCI format. The DCI comprises downlink scheduling information that indicates downlink resources allocated for a downlink data channel transmission to the wireless communication device, and the fallback DCI format does not include an explicit indication of a downlink data channel group identifier of a downlink data channel group of the downlink data channel transmission. The method further comprises attempting to receive and decode the downlink data channel transmission in accordance with the DCI and determining a downlink data channel group for the downlink data channel transmission based on the DCI. The method further comprises generating a dynamic codebook HARQ feedback for the downlink data channel group, where the dynamic codebook HARQ feedback comprises HARQ feedback for the downlink data channel transmission. The method further comprises transmitting the dynamic codebook HARQ feedback to the base station. In this manner, downlink data channel grouping can be used even for the fallback DCI format.

In one embodiment, the DCI further comprises a downlink assignment index (DAI) and a downlink data channel to HARQ feedback timing indicator.

In one embodiment, determining the downlink data channel group for the downlink data channel transmission based on the DCI comprises determining that the downlink data channel group is a predefined data channel group based on the DCI. In one embodiment, the predefined data channel group is a predefined data channel group for downlink data channel transmissions scheduled via DCI using the fallback DCI format.

In one embodiment, determining the downlink data channel group for the downlink data channel transmission comprises determining that the downlink data channel group is a preconfigured downlink channel group. In one embodiment, the preconfigured data channel group is a preconfigured data channel group for downlink data channel transmissions scheduled via DCI using the fallback DCI format.

In one embodiment, determining the downlink data channel group for the downlink data channel transmission based on the DCI comprises determining that the downlink data channel group is an implicit downlink data channel group for downlink data channel transmissions scheduled via DCI using the fallback DCI format.

In one embodiment, the fallback DCI format also does not include a New Feedback Indicator (NFI).

In one embodiment, the fallback DCI format is New Radio (NR) DCI format 1_0.

In one embodiment, determining the downlink data channel group for the downlink data channel transmission comprises determining that the downlink data channel group is a group to which downlink data channel transmissions that have the same data to HARQ-ACK timing are assigned.

In one embodiment, determining the downlink data channel group for the downlink data channel transmission comprises determining that the downlink data channel group is a group to which downlink data channel transmissions that have the same data to HARQ-ACK timing and are scheduled by DCI having the fallback DCI format are assigned.

In one embodiment, determining the downlink data channel group for the downlink data channel transmission comprises determining the downlink data channel group based on a predefined or preconfigured mapping. In one embodiment, the mapping is based on time, frequency, Radio Network Temporary Identifier (RNTI), Demodulation Reference Signal (DMRS) sequence, or a search space in which the DCI is received.

In one embodiment, the method further comprises receiving, from the base station, a request for dynamic codebook HARQ feedback for one or more downlink data channel groups comprising the determined downlink data channel group of the downlink data channel transmission. In one embodiment, the request for dynamic codebook HARQ feedback for the one or more downlink data channel groups is comprised in the DCI. In another embodiment, receiving the request comprises receiving second DCI comprising information that indicates that dynamic codebook HARQ feedback is requested for the one or more downlink data channel groups. In one embodiment, the second DCI is in accordance with an uplink DCI format. In one embodiment, the uplink DCI format is such that the second DCI comprises downlink assignment indices that reflect a latest total downlink assignment index (T-DAI) for each of the one or more downlink data channel groups for which dynamic codebook HARQ feedback is requested. In one embodiment, the uplink DCI format is such that the second DCI comprises information that reflects a status of a latest total downlink assignment index, T-DAI, of a respective downlink channel group. In one embodiment, the uplink DCI format is such that the second DCI comprises a downlink assignment index (DAI) that reflects a latest T-DAI of a latest scheduled downlink channel group that is to be reported. In one embodiment, the uplink DCI format is such that the second DCI comprises a DAI that reflects a latest T-DAI of a latest transmitted downlink channel group that is to be reported. In one embodiment, the uplink DCI format is such that the second DCI repurposes one or more DAI fields as an indication of the one or more downlink data channel groups for which dynamic codebook HARQ feedback is requested. In one embodiment, the DCI format of the second DCI is such that the second DCI comprises one or more DAIs that reflect a size of the requested dynamic codebook.

Corresponding embodiments of a wireless communication device are also disclosed. In one embodiment, a wireless communication device for dynamic codebook HARQ feedback is adapted to receive, from a base station, a DCI in accordance with a fallback DCI format, wherein the DCI comprises downlink scheduling information that indicates downlink resources allocated for a downlink data channel transmission to the wireless communication device, and the fallback DCI format does not include an explicit indication of a downlink data channel group identifier of a downlink data channel group of the downlink data channel transmission. The wireless communication device is further adapted to attempt to receive and decode the downlink data channel transmission in accordance with the DCI and determine a downlink data channel group for the downlink data channel transmission based on the DCI. The wireless communication device is further adapted to generate a dynamic codebook HARQ feedback for the downlink data channel group, the dynamic codebook HARQ feedback comprising HARQ feedback for the downlink data channel transmission. The wireless communication device is further adapted to transmit the dynamic codebook HARQ feedback to the base station.

In one embodiment, a wireless communication device for dynamic codebook HARQ feedback comprises one or more transmitters, one or more receivers, and processing circuitry associated with the one or more transmitters and the one or more receivers. The processing circuitry is configured to cause the wireless communication device to receive, from a base station, a DCI in accordance with a fallback DCI format, wherein the DCI comprises downlink scheduling information that indicates downlink resources allocated for a downlink data channel transmission to the wireless communication device, and the fallback DCI format does not include an explicit indication of a downlink data channel group identifier of a downlink data channel group of the downlink data channel transmission. The processing circuitry is further configured to cause the wireless communication device to attempt to receive and decode the downlink data channel transmission in accordance with the DCI and determine a downlink data channel group for the downlink data channel transmission based on the DCI. The processing circuitry is further configured to cause the wireless communication device to generate a dynamic codebook HARQ feedback for the downlink data channel group, the dynamic codebook HARQ feedback comprising HARQ feedback for the downlink data channel transmission. The processing circuitry is further configured to cause the wireless communication device to transmit the dynamic codebook HARQ feedback to the base station.

In another embodiment, a method performed by a wireless communication device for dynamic codebook HARQ feedback comprises receiving, from a base station, a DCI in accordance with an uplink DCI format. In accordance with the uplink DCI format, the DCI comprises either: DAIs for two or more downlink data channel groups for which dynamic codebook HARQ feedback is to be reported in an uplink resource scheduled by the DCI, each of the DAIs reflecting a status of a latest downlink T-DAI of a respective one of the two or more downlink data channel groups; a DAI that reflects a status of a latest T-DAI of a latest scheduled downlink data channel group from among the two or more downlink data channel groups for which dynamic codebook HARQ feedback is to be reported in an uplink resource scheduled by the DCI; a DAI that reflects a status of a latest T-DAI of a latest transmitted downlink data channel group from among the two or more downlink data channel groups for which dynamic codebook HARQ feedback is to be reported in an uplink resource scheduled by the DCI; two bits in each of two uplink DAI fields of the DCI that are repurposed to indicate one or more downlink data channel groups for which dynamic codebook HARQ feedback is to be reported in an uplink resource scheduled by the DCI; or one or more DAIs that reflect a size of a dynamic codebook HARQ feedback being requested by the DCI. The method further comprises generating a dynamic codebook HARQ feedback in accordance with the DCI and transmitting the dynamic codebook HARQ feedback to the base station.

Corresponding embodiments of a wireless communication device are also disclosed. In one embodiment, a wireless communication device for dynamic codebook HARQ feedback is adapted to receive, from a base station, a DCI in accordance with an uplink DCI format. In accordance with the uplink DCI format, the DCI comprises either: DAIs for two or more downlink data channel groups for which dynamic codebook HARQ feedback is to be reported in an uplink resource scheduled by the DCI, each of the DAIs reflecting a status of a latest downlink T-DAI of a respective one of the two or more downlink data channel groups; a DAI that reflects a status of a latest T-DAI of a latest scheduled downlink data channel group from among the two or more downlink data channel groups for which dynamic codebook HARQ feedback is to be reported in an uplink resource scheduled by the DCI; a DAI that reflects a status of a latest T-DAI of a latest transmitted downlink data channel group from among the two or more downlink data channel groups for which dynamic codebook HARQ feedback is to be reported in an uplink resource scheduled by the DCI; two bits in each of two uplink DAI fields of the DCI that are repurposed to indicate one or more downlink data channel groups for which dynamic codebook HARQ feedback is to be reported in an uplink resource scheduled by the DCI; or one or more DAIs that reflect a size of a dynamic codebook HARQ feedback being requested by the DCI. The wireless communication device is further adapted to generate a dynamic codebook HARQ feedback in accordance with the DCI and transmit the dynamic codebook HARQ feedback to the base station.

In one embodiment, a wireless communication device for dynamic codebook HARQ feedback comprises one or more transmitters, one or more receivers, and processing circuitry associated with the one or more transmitters and the one or more receivers. The processing circuitry is configured to cause the wireless communication device to receive, from a base station, a DCI in accordance with an uplink DCI format. In accordance with the uplink DCI format, the DCI comprises either: DAIs for two or more downlink data channel groups for which dynamic codebook HARQ feedback is to be reported in an uplink resource scheduled by the DCI, each of the DAIs reflecting a status of a latest downlink T-DAI of a respective one of the two or more downlink data channel groups; a DAI that reflects a status of a latest T-DAI of a latest scheduled downlink data channel group from among the two or more downlink data channel groups for which dynamic codebook HARQ feedback is to be reported in an uplink resource scheduled by the DCI; a DAI that reflects a status of a latest T-DAI of a latest transmitted downlink data channel group from among the two or more downlink data channel groups for which dynamic codebook HARQ feedback is to be reported in an uplink resource scheduled by the DCI; two bits in each of two uplink DAI fields of the DCI that are repurposed to indicate one or more downlink data channel groups for which dynamic codebook HARQ feedback is to be reported in an uplink resource scheduled by the DCI; or one or more DAIs that reflect a size of a dynamic codebook HARQ feedback being requested by the DCI. The processing circuitry is further configured to cause the wireless communication device to generate a dynamic codebook HARQ feedback in accordance with the DCI and transmit the dynamic codebook HARQ feedback to the base station.

Embodiments of a method performed by a base station for dynamic codebook HARQ feedback are also disclosed. In one embodiment, a method performed by a base station for dynamic codebook HARQ feedback comprises determining a downlink data channel group for a downlink data channel transmission and generating DCI that schedules the downlink data channel transmission to a wireless communication device, wherein the DCI is in accordance with a fallback DCI format that does not include an explicit indication of a downlink data channel group identifier of the downlink data channel group of the downlink data channel transmission. The method further comprises transmitting or initiating transmission of the DCI to the wireless communication device and transmitting or initiating transmission of the downlink data channel transmission to the wireless communication device. The method further comprises receiving, from the wireless communication device, dynamic codebook HARQ feedback for the downlink data channel group, the dynamic codebook HARQ feedback comprising HARQ feedback for the downlink data channel transmission.

In one embodiment, the DCI further comprises a DAI and a downlink data channel to HARQ feedback timing indicator.

In one embodiment, the downlink data channel group is a predefined data channel group. In one embodiment, the predefined data channel group is a predefined data channel group for downlink data channel transmissions scheduled via DCI using the fallback DCI format.

In one embodiment, the fallback DCI format also does not include a NFI.

In one embodiment, the fallback DCI format is NR DCI format 1_0.

In one embodiment, the method further comprises transmitting or initiating transmission of a request to the wireless communication device for dynamic codebook HARQ feedback for one or more downlink data channel groups comprising the determined downlink data channel group of the downlink data channel transmission. In one embodiment, the request for dynamic codebook HARQ feedback for the one or more downlink data channel groups is comprised in the DCI. In one embodiment, transmitting or initiating transmission of the request comprises transmitting or initiating transmission of second DCI comprising information that indicates that dynamic codebook HARQ feedback is requested for the one or more downlink data channel groups. In one embodiment, the second DCI is in accordance with a DCI format that does not include downlink data channel transmission group identifiers for one or more downlink data channel groups for which dynamic codebook HARQ feedback is requested. In one embodiment, the second DCI is in accordance with an uplink DCI format. In one embodiment, the uplink DCI format is such that the second DCI comprises downlink assignment indices that reflect a latest T-DAI for each of the one or more downlink data channel groups for which dynamic codebook HARQ feedback is requested. In one embodiment, the uplink DCI format is such that the second DCI comprises information that reflects a status of a latest T-DAI of a respective downlink channel group. In one embodiment, the uplink DCI format is such that the second DCI comprises a DAI that reflects a latest T-DAI of a latest scheduled downlink channel group that is to be reported. In one embodiment, the uplink DCI format is such that the second DCI comprises a DAI that reflects a latest T-DAI of a latest transmitted downlink channel group that is to be reported. In one embodiment, the uplink DCI format is such that the second DCI repurposes one or more DAI fields as an indication of the one or more downlink data channel groups for which dynamic codebook HARQ feedback is requested. In one embodiment, the DCI format of the second DCI is such that the second DCI comprises one or more DAIs that reflect a size of the requested dynamic codebook.

Corresponding embodiments of a base station are also disclosed. In one embodiment, a base station for dynamic codebook HARQ feedback is adapted to determine a downlink data channel group for a downlink data channel transmission and generate DCI that schedules the downlink data channel transmission to a wireless communication device. The DCI is in accordance with a fallback DCI format that does not include an explicit indication of a downlink data channel group identifier of the downlink data channel group of the downlink data channel transmission. The base station is further adapted to transmit or initiating transmission of the DCI to the wireless communication device and transmit or initiate transmission of the downlink data channel transmission to the wireless communication device and receive, from the wireless communication device, dynamic codebook HARQ feedback for the downlink data channel group, the dynamic codebook HARQ feedback comprising HARQ feedback for the downlink data channel transmission.

In one embodiment, a base station for dynamic codebook HARQ feedback comprises processing circuitry configured to cause the base station to determine a downlink data channel group for a downlink data channel transmission and generate DCI that schedules the downlink data channel transmission to a wireless communication device. The DCI is in accordance with a fallback DCI format that does not include an explicit indication of a downlink data channel group identifier of the downlink data channel group of the downlink data channel transmission. The base station is further adapted to transmit or initiate transmission of the DCI to the wireless communication device and transmit or initiate transmission of the downlink data channel transmission to the wireless communication device. The base station is further adapted to receive, from the wireless communication device, dynamic codebook HARQ feedback for the downlink data channel group, the dynamic codebook HARQ feedback comprising HARQ feedback for the downlink data channel transmission.

In another embodiment, a method performed by a base station for dynamic codebook HARQ feedback comprises transmitting or initiating transmission of a DCI to a wireless communication device. The DCI is in accordance with an uplink DCI format and the uplink DCI format is such that the DCI comprises either: DAIs for two or more downlink data channel groups for which dynamic codebook HARQ feedback is to be reported in an uplink resource scheduled by the DCI, each of the DAIs reflecting a status of a latest downlink T-DAI of a respective one of the two or more downlink data channel groups; a DAI that reflects a status of a latest T-DAI of a latest scheduled downlink data channel group from among the two or more downlink data channel groups for which dynamic codebook HARQ feedback is to be reported in an uplink resource scheduled by the DCI; a DAI that reflects a status of a latest T-DAI of a latest transmitted downlink data channel group from among the two or more downlink data channel groups for which dynamic codebook HARQ feedback is to be reported in an uplink resource scheduled by the DCI; two bits in each of two uplink DAI fields of the DCI that are repurposed to indicate one or more downlink data channel groups for which dynamic codebook HARQ feedback is to be reported in an uplink resource scheduled by the DCI; or one or more DAIs that reflect a size of a dynamic codebook HARQ feedback being requested by the DCI. The method further comprises receiving dynamic codebook HARQ feedback from the wireless communication device in accordance with the DCI.

Corresponding embodiments of a base station are also disclosed. In one embodiment, a base station for dynamic codebook HARQ feedback is adapted to transmit or initiate transmission of a DCI to a wireless communication device. The DCI is in accordance with an uplink DCI format and the uplink DCI format is such that the DCI comprises either: DAIs for two or more downlink data channel groups for which dynamic codebook HARQ feedback is to be reported in an uplink resource scheduled by the DCI, each of the DAIs reflecting a status of a latest downlink T-DAI of a respective one of the two or more downlink data channel groups; a DAI that reflects a status of a latest T-DAI of a latest scheduled downlink data channel group from among the two or more downlink data channel groups for which dynamic codebook HARQ feedback is to be reported in an uplink resource scheduled by the DCI; a DAI that reflects a status of a latest T-DAI of a latest transmitted downlink data channel group from among the two or more downlink data channel groups for which dynamic codebook HARQ feedback is to be reported in an uplink resource scheduled by the DCI; two bits in each of two uplink DAI fields of the DCI that are repurposed to indicate one or more downlink data channel groups for which dynamic codebook HARQ feedback is to be reported in an uplink resource scheduled by the DCI; or one or more DAIs that reflect a size of a dynamic codebook HARQ feedback being requested by the DCI. The base station is further adapted to receive dynamic codebook HARQ feedback from the wireless communication device in accordance with the DCI.

In another embodiment, a base station for dynamic codebook HARQ feedback comprises processing circuitry configured to cause the base station to transmit or initiate transmission of a DCI to a wireless communication device. The DCI is in accordance with an uplink DCI format and the uplink DCI format is such that the DCI comprises either: DAIs for two or more downlink data channel groups for which dynamic codebook HARQ feedback is to be reported in an uplink resource scheduled by the DCI, each of the DAIs reflecting a status of a latest downlink T-DAI of a respective one of the two or more downlink data channel groups; a DAI that reflects a status of a latest T-DAI of a latest scheduled downlink data channel group from among the two or more downlink data channel groups for which dynamic codebook HARQ feedback is to be reported in an uplink resource scheduled by the DCI; a DAI that reflects a status of a latest T-DAI of a latest transmitted downlink data channel group from among the two or more downlink data channel groups for which dynamic codebook HARQ feedback is to be reported in an uplink resource scheduled by the DCI; two bits in each of two uplink DAI fields of the DCI that are repurposed to indicate one or more downlink data channel groups for which dynamic codebook HARQ feedback is to be reported in an uplink resource scheduled by the DCI; or one or more DAIs that reflect a size of a dynamic codebook HARQ feedback being requested by the DCI. The processing circuitry is further configured to cause the base station to receive dynamic codebook HARQ feedback from the wireless communication device in accordance with the DCI.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 shows an example New Radio (NR) Hybrid Automatic Repeat Request (HARQ) feedback flexible timing;

FIG. 2 illustrates an example of the use of a Downlink Assignment Index (DAI) for NR HARQ;

FIGS. 12 and 13 are flow charts that illustrate example embodiments of methods implemented in a communication system such as that of FIG. 10.

DETAILED DESCRIPTION

Figure 3:
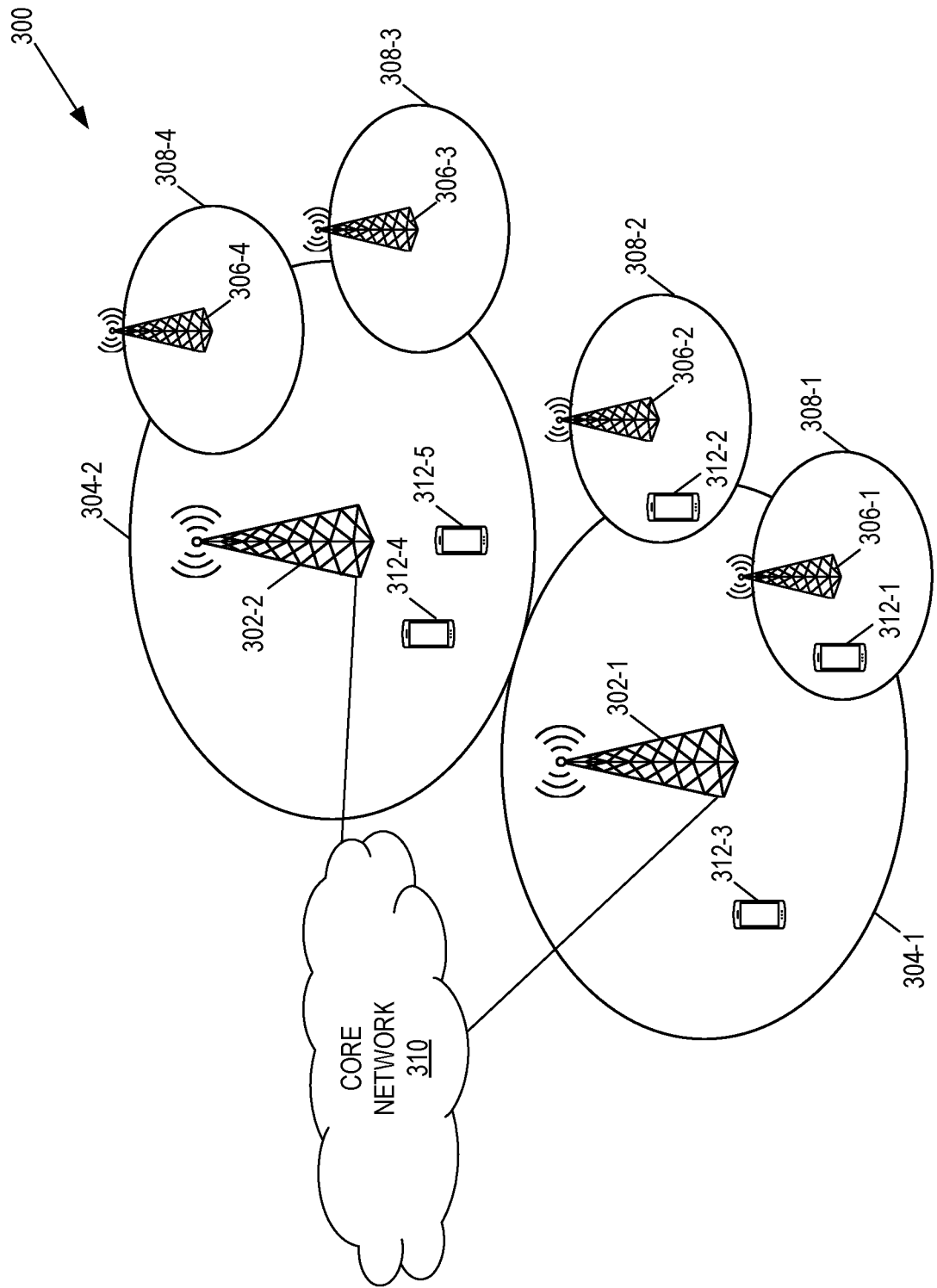
FIG. 3 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with respect to Hybrid Automatic Repeat Request (HARQ) feedback in 3GPP NR. The fallback format 1_0 is smaller in size as compared to non-fallback format 1_1, supports a limited set of NR functionality, and has a set of information fields that is in general not configurable, resulting in a more or less fixed DCI size. Following the same reasoning, indicating the new fields related to dynamic HARQ codebook enhancement might not be possible in the DL fallback DCI. This will lead to a major issue if the gNB simultaneously schedules PDSCHs using fallback and non-fallback DCI.

With enhanced dynamic HARQ codebook, two PDSCH groups are supported. Counter DAI (C-DAI)/Total DAI (T-DAI) is accumulated only within each PDSCH group. This means that two C-DAIs/T-DAIs run in parallel, one corresponding to the first PDSCH group and the other corresponding to the second PDSCH group. It is not clear how the DAI value in the fallback DCI should be set in relation to the DAI value of the other PDSCH groups scheduled using the non-fallback DCIs. The same problem will occur for the DAI value in the Uplink (UL) grant DCI (both fallback and non-fallback).

Certain aspects of the present disclosure and their embodiments may provide solutions to the aforementioned or other challenges. Systems and methods are disclosed herein that provide ways in which PDSCH grouping is indicated/used in combination with the DL fallback DCI (1_0) and UL grant.

In this regard, FIG. 3 illustrates one example of a cellular communications system 300 in which embodiments of the present disclosure may be implemented. In the embodiments described herein, the cellular communications system 300 is a 5G system (5GS) including a NR RAN or LTE RAN (i.e., E-UTRA RAN); however, the present disclosure is not limited thereto. For example, the embodiments disclosed herein may alternatively be used in an Evolved Packet System (EPS) including a LTE RAN. In this example, the RAN includes base stations 302-1 and 302-2, which in 5G NR are referred to as gNBs or ng-eNBs (LTE RAN nodes connected to the 5G Core), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Some example embodiments will now be described. While described under separate headings, these embodiments may be used separately or in any desired combination unless explicitly stated or otherwise required.

Embodiment 1: Enhanced Dynamic Codebook in Case of Fallback DCI

Embodiment 1a

Enhanced dynamic codebook is also supported for the fallback DCI. The fallback DCI indicates at least one of below information:
Group ID: This the a ID for the PDSCH group to which the scheduled PDSCH belongs;
New feedback indicator (NFI);
Indication of the requested group(s) for which HARQ feedback is to be provided.

Embodiment 1b

PDSCH(s) scheduled by fallback DCI implicitly belong to a separate PDSCH group. T/C-DAI is accumulated within this PDSCH group. Two possible alternatives are:
Alternative 1: The DCI does not include an explicit indication of the group ID, or NFI, or any enhanced dynamic codebook related fields. In this case, the gNB can not request retransmission of HARQ feedback corresponding to PDSCH(s) scheduled using a fallback DCI.
Alternative 2: The fallback DCI includes an NFI bit which enables the gNB the possibility to request retransmission of HARQ feedback corresponding to PDSCH(s) scheduled using the fallback DCI.

As another aspect of this embodiment, when more than one PDSCH group feedback exists in a HARQ-ACK feedback report (i.e. multiple codebooks in same PUCCH/UCI), and the implicit PDSCH group is one of them:
The order of the codebooks is predefined. As a non-limiting example,
The implicit group is placed first, followed by the other groups based on increasing group index.
Or, the implicit group is placed last, following the other groups with explicit index.

Embodiment 1c

The gNB schedules the HARQ feedback for the PDSCH transmissions scheduled using fallback DCI to have different time and/or frequency resources as compared to the PDSCH scheduled using non-fallback DCI. Accordingly, multiple PUCCH can be scheduled in the same slot/symbols (i.e., in partially or fully overlapping time domain resources). Thus, in this embodiment, a scheduler at the gNB performs scheduling of PDSCH transmissions such that HARQ feedback for PDSCH transmissions scheduled by sending non-fallback DCIs to the UE and HARQ feedback for PDSCH transmissions scheduled by sending fallback DCIs to the UE will use different time and/or frequency resources. The UE receives the DCIs, attempts to decode the corresponding PDSCH transmissions, and reports HARQ feedback in the normal manner.

Embodiment 1d

The PDSCH group to which the PDSCHs scheduled by a fallback DCI belong is predefined. As an example, this PDSCH group maybe predefined as the PDSCH group having Group Id (0). C-DAI/T-DAI is accumulated only within each PDSCH group.

As another alternative, the PDSCH group to which the PDSCHs scheduled by a fallback DCI belong is configured by the gNB. The configuration may be signaled by the gNB using system information, a dedicated (e.g., semi-static) signaling (e.g., RRC signaling), or dynamic signaling (e.g., a MAC CE).

Embodiment 1e

The PDSCHs scheduled by a fallback DCI belong to the same group with the same data to HARQ-ACK timing (e.g., the PDSCHs occur in different time resources but their $K_1$ values are such that their HARQ feedbacks all occur in the same slot).

If more than one PDSCH group has the same HARQ-ACK-timing, the scheduled PDSCH belongs to:
  the PDSCH group with the smallest index,
  the same PDSCH group as the latest scheduled PDSCH with the same data to HARQ-ACK timing, or
  the same PDSCH group as the next scheduled PDSCH with the same data to HARQ-ACK timing.

Embodiment 1f

The PDSCH group ID is not carried explicitly in the fallback DCI. Instead, the PDSCH group index that is requested for providing HARQ ACK-feedback is implicitly indicated via at least one of below mechanisms:
1. Mapping each PDSCH group or PDSCH group index to specific time positions. There may be several options to configure the mapping rule. In one option, the gNB may use specific PDCCH time occasions to indicate a PDSCH group or PDSCH group index. The PDCCH time occasions can be indexed with an integer number. In one example, the occasions with even indices are mapped to the first PDSCH group, while the occasions with odd indices are mapped to the second PDSCH group, etc. If there are N PDSCH groups defined for providing HARQ ACK feedback, the PDCCH time occasions can be split into N parts. So, the time occasions with indices that mod N=0 are associated with the first PDSCH group, while the time occasions with indices that mod N=1 are associated with the second PDSCH group, and so on. In another option, a PDSCH group or PDSCH group index is mapped to a time period. The gNB may configure a window period for each PDSCH group. During a given window period, the gNB only requests for the associated PDSCH group using a fallback DCI. In another window period, the gNB requests another PDSCH group using a fallback DCI. In yet another option, a PDSCH group or PDSCH group index is associated to a range of OFDM symbol positions. These options are just some examples. This embodiment is not limited by these examples. There may be other options to configure the mapping between PDSCH groups and fallback DCIs in time domain.
2. Mapping each PDSCH group or PDSCH group index to specific frequency positions. In one example, fallback DCIs for indicating different PDSCH groups may be configured in different frequency regions (e.g., different LBT subbands/channels, different BWPs, or different carriers/cells).
3. Mapping PDSCH groups to different RNTIs, DMRS sequences, or search spaces etc.

For any above mechanisms, the inclusion of group IDs in the fallback DCIs is avoided so to limit the potential changes imposed on the fallback DCI. Based on configured mapping relations, upon reception of a fallback DCI, the UE knows the corresponding groups that the DCI is associated with.

Embodiment 2: Enhanced Dynamic Codebook in Case of UL DCI

In Release 15, UL grant (DCI 0-1) contains two UL DAIs, reflecting status of each latest DL T-DAI (DCI 0-0 does not contain any DAI).

$1^{st}$ downlink assignment index—1 or 2 bits:
  1 bit for semi-static HARQ-ACK codebook;
  2 bits for dynamic HARQ-ACK codebook.
$2^{nd}$ downlink assignment index—0 or 2 bits:
  2 bits for dynamic HARQ-ACK codebook with two HARQ-ACK sub-codebooks;
  0 bit otherwise.

Note, however, that in Release 15, there is no concept of a PDSCH group. There is only one running DAI counter, or two in the case of MIMO.

Embodiment 2a

As one embodiment, the UL DCI is extended to include downlink assignment index (indices) for each PDSCH group. Each DAI reflects the status of the latest DL total DAI of a respective PDSCH group. Thus, as an example, if there are two PDSCH groups, there are two DAI counters running in parallel (or four DAI counters running in parallel in case of MIMO). So, if there are two PDSCH groups scheduled by non-fallback DCIs and one PDSCH group scheduled by fallback DCIs, the UL DCI includes three DAIs (or 6 in the case of MIMO), two DAIs to reflect the status of the latest DL T-DAIs of the two PDSCH groups scheduled by non-fallback DCIs and another DAI to reflect the status of the latest DL T-DAI of the PDSCH group scheduled by fallback DCIs.

Embodiment 2b

In another embodiment, the existing DAI (or both existing DAIs when using MIMO), reflect status of the latest DL total DAI of the latest scheduled PDSCH group that should be reported in the scheduled UL resource.

In another embodiment, the existing DAI reflects the status of that latest DL total DAI of the latest transmitted PDSCH group that should be reported in the scheduled UL resource.

For example, assume that the gNB transmitted as PDSCH transmission belonging to PDSCH Group 1 that has a T-DAI of 1 and indicates in the downlink DCI that feedback should come at n+4. Also assume that the gNB transmitted another PDSCH transmission belonging to PDSCH Group 2 is sent later than PDSCH Group 1 and has a total DAI of 2 and that the gNB indicates the same timing as PDSCH Group 2. Let's say that, at n+3, the gNB sends an UL grant. Then, the DAI value will be the one for PDSCH Group 2 only.

Embodiment 2c

The two bits in each UL DAI field are repurposed to indicate the PDSCH groups for which the feedback is requested. As a non-limiting example, the two bits of a DAI field indicate a bitmap, where each bit corresponds to a different PDSCH group. If the bit is set to 1, the UE should send HARQ feedback corresponding to that PDSCH group.

Embodiment 2d

The UL DAI(s) reflects the size of the requested codebook. The indicated DAI(s) takes into account the sum of all PDSCH, irrespective of the group id, that should be reported in the corresponding UL resources. The modulus operation from Release 15 (see, e.g., 3GPP TS 38.213 V15.6.0 Sections 9.1.3.1 and 9.1.3.2) is unchanged.

For example, assume that the gNB sent a PDSCH transmission belonging to PDSCH Group 1 that has a total DAI of 1, and indicates in the DL DCI that feedback should come at n+4. Also assume that the gNB sent another PDSCH transmission belonging to PDSCH Group 2 that has a total DAI of 2, and indicates the same timing as PDSCH Group 1. Let's say at n+3 the gNB sends an UL grant. Then, the DAI value will be the sum of the two groups (1+2=3). The UE will know that the size of the codebook that carries feedback for both PDSCH Group 1 and PDSCH Group 2 is expected to be 3.

As for the modulus operation, DAI value in NR goes from 0 to 3 and repeats. So, if for the fourth transmitted PDSCH, the DAI value will be again 0.

Embodiment 2e

The methods described in Embodiment 1e are also applicable to a DCI carrying UL grant.

Figure 4A:
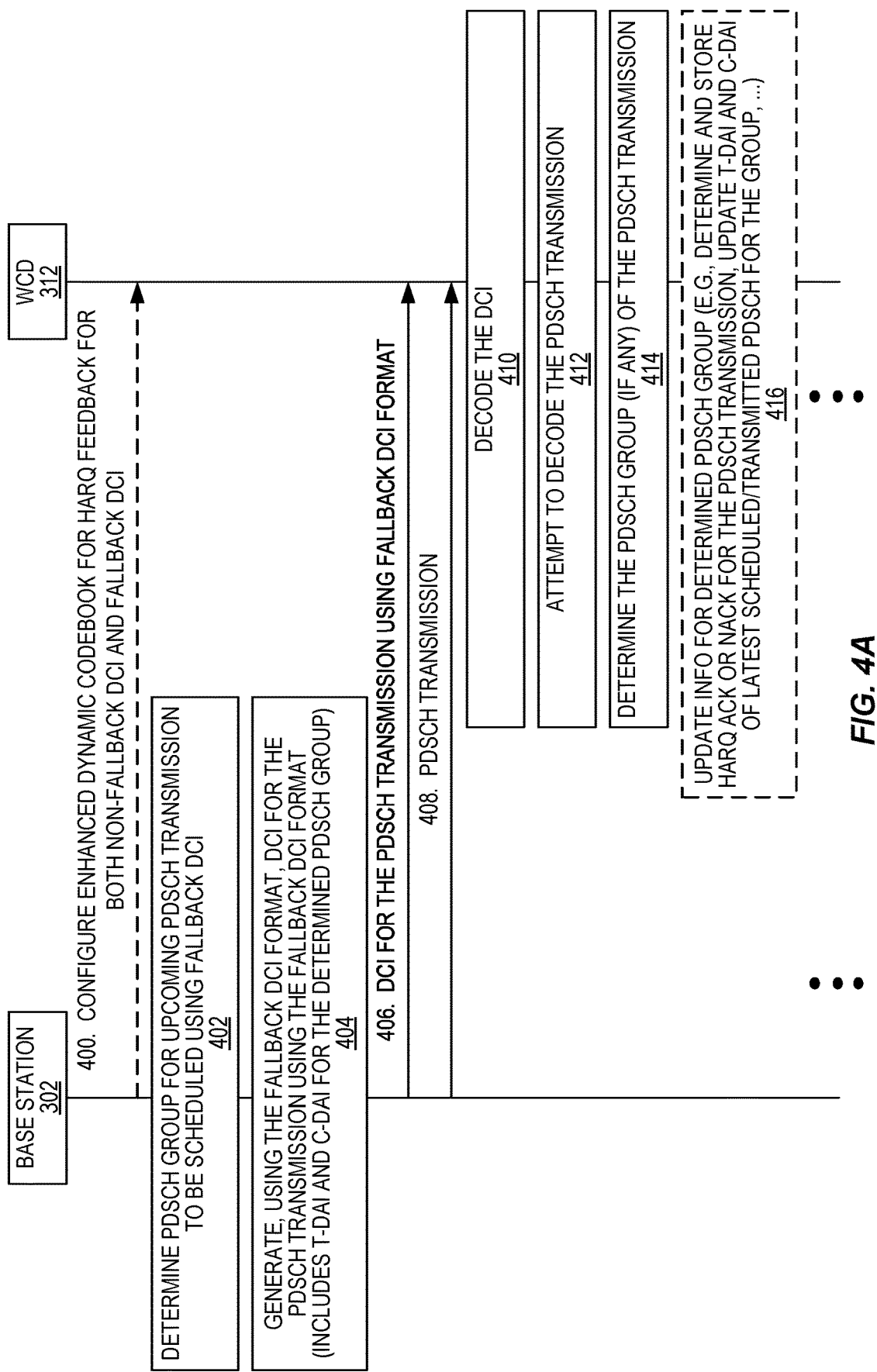
FIGS. 4A and 4B illustrate one example process using dynamic codebook HARQ feedback with the fallback DCI format or a mixture of DCI formats in accordance with embodiments of the present disclosure.
Figure 4B:
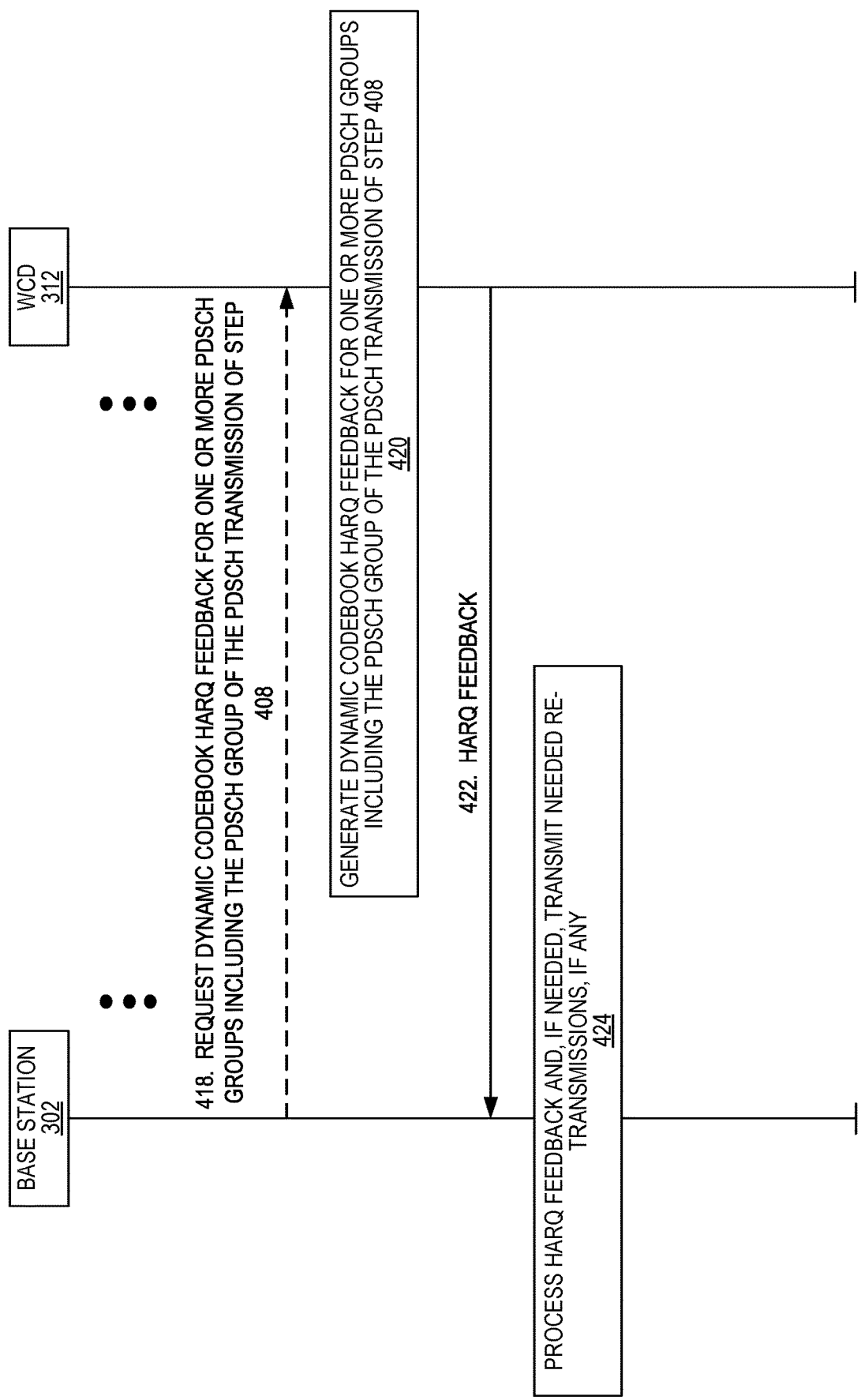

FIGS. 4A and 4B illustrate one example process using dynamic codebook HARQ feedback with the fallback DCI format or a mixture of DCI formats in accordance with at least some aspects of Embodiments 1 and 2 above. Optional steps are represented by dashed lines or dashed boxes. Note that this process is only an example. Embodiments 1 and 2 above are not limited to being used in this process. It should also be noted that while the base station 302 (e.g., gNB) is illustrated as a single box or element, depending on the particular implementation, the base station 302 (e.g., gNB) may be implemented as a single network node or may be distributed across two or more network nodes. For example, the base station 302 may be implemented as two separate network nodes, namely, a first network node that implements e.g. the PHY and at least a portion of the MAC layer and a second network node that implements higher layers and possibly at portion of the MAC layer. As a specific example, in the case of a gNB, the functionality of the gNB may be separated between a gNB Centralized Unit (gNB-CU) and one or more gNB Distributed Units (gNB-DUs). In this regard, steps or functions described herein as being performed by the base station 302 or gNB may be performed in a distributed manner. For example, a network node that implements the higher layer functionality may "initiate" transmission of a particular message (e.g., by sending the message to another network node that implements the lower layer(s)), thereby causing the other network node that implements the lower layer functionality to actually transmit the particular message.

Looking at FIGS. 4A and 4B, the base station 302 (e.g., gNB) optionally configures the wireless communication device (WCD) 312 (e.g., UE) for enhanced dynamic codebook HARQ feedback for, e.g., both non-fallback DCI and fallback DCI (or alternatively only for fallback DCI) (step 400). This configuration may include, e.g., a configuration of the PDSCH group for PDSCH transmissions scheduled by fallback DCI. The base station 302 determines a PDSCH group (if any) for an upcoming PDSCH transmission to the WCD 312 that is to be scheduled using fallback DCI (step 402). In this example, it is assumed that the PDSCH transmission is determined to be included in a PDSCH group. The base station 302 may determine the PDSCH group using any of variations and aspects described above with respect to Embodiment #1. For example, if the Group ID of the PDSCH group is to be included in the DCI in accordance with Embodiment 1a, the base station 302 determines the PDSCH group using any desired technique (e.g., the same technique used to assign PDSCH transmissions scheduled by non-fallback DCI to PDSCH groups). As another example, if PDSCH transmissions are implicitly assigned to the same PDSCH group (Embodiment 1b) or are assigned to a predefined or preconfigured PDSCH group (Embodiment 1d) or are assigned to the same PDSCH group as other PDSCH transmissions having the same data to HARQ-ACK timing (Embodiment 1e), then the base station 302 determines that the PDSCH transmission is to be assigned to that PDSCH group because it is to be scheduled using fallback DCI. As another example, the PDSCH transmission may be mapped to a PDSCH group using a predefined or preconfigured mapping, as described above with respect to Embodiment 1f.

The base station 302 generates DCI for the PDSCH transmission using the fallback DCI format (i.e., the generated DCI is thus "fallback DCI") (step 404). As discussed above, in Embodiment 1a, the fallback DCI format is extended to include the Group ID of the determined PDSCH group for the PDSCH transmission. In some other embodiments the fallback DCI format is extended to additionally or alternatively include a NFI (Embodiment 1b, Alternative 2) and/or an indication of PDSCH group(s) for which HARQ feedback is being requested (in the case of UL DCI). However, in other embodiments (e.g., Embodiments 1c, 1b (Alternative 1), 1d, 1e, and 1f), the fallback DCI format does not include the Group ID of the determined PDSCH group or the NFI and possibly not an indication of PDSCH group(s) for which HARQ feedback is being requested (in the case of UL DCI). The generated DCI also includes the T-DAI and C-DAI for the determined PDSCH group (i.e., the T-DAI and C-DAI for the PDSCH group are incremented and included in the generated DCI).

The base station 302 transmits the generated DCI to the WCD 312 and also transmits the PDSCH transmission to the WCD 312 in accordance with the DCI (steps 406 and 408).

At the WCD 312, the WCD 312 receives and decodes the DCI in accordance with the fallback DCI format (step 410). In addition, the WCD 312 attempts to receive and decode the PDSCH transmission scheduled by the DCI (step 412). The WCD 312 determines the PDSCH group (if any) of the PDSCH transmission (step 414). In this example, the PDSCH transmission is assigned to a PDSCH group (implicitly or explicitly) even though the PDSCH transmission is scheduled using fallback DCI. The WCD 312 may determine the PDSCH group using any of variations and aspects described above with respect to Embodiment #1. For example, if the fallback DCI format is extended to include the Group ID of the PDSCH group in accordance with Embodiment 1a, the WCD 312 determines the PDSCH group by obtaining the Group ID from the DCI received and decoded in step 410. As another example, if PDSCH transmissions are implicitly assigned to the same PDSCH group (Embodiment 1b) or are assigned to a predefined or preconfigured PDSCH group (Embodiment 1d) or are assigned to the same PDSCH group as other PDSCH transmissions having the same data to HARQ-ACK timing (Embodiment 1e), then the WCD 312 determines the PDSCH group of the PDSCH transmission accordingly. As another example, the WCD 312 determines the PDSCH group of the PDSCH transmission in accordance with a predefined or preconfigured mapping, as described above with respect to Embodiment 1f.

The WCD 312 updates information stored for the determined PDSCH group (step 416). For example, the WCD 312 may determine and store an HARQ ACK or NACK for the PDSCH transmission in association with the PDSCH group based on whether the WCD 312 was able to successfully decode the PDSCH transmission in step 412. As another example, the WCD 312 may update values stored at the WCD 312 for T-DAI and/or C-DAI for the latest scheduled or transmitted PDSCH transmission for the PDSCH group. Note that these are only examples.

Optionally, the base station 302 may schedule and transmit additional PDSCH transmission(s) using fallback DCI and/or schedule and transmit additional PDSCH transmission(s) using non-fallback DCI (not shown). The WCD 312 receives and decodes the DCI(s) scheduling those PDSCH transmission(s) and attempts to decode the PDSCH transmission(s), in a manner similar that described above.

Sometime thereafter, it is time to transmit HARQ feedback for the PDSCH group for the PDSCH transmission of step 408 either in accordance with the data-to-HARQ ACK timing or in response to receiving a request for HARQ feedback for the PDSCH group from the base station 302. In the case of a request, the base station 302 sends a request to the WCD 312 for dynamic codebook HARQ feedback for one or more PDSCH groups (step 418). In this example, the one or more requested PDSCH groups include the PDSCH group of the PDSCH transmission of step 408. Note that, as described above, the fallback DCI format may, in some embodiments, include an indication of one or more PDSCH groups for which dynamic codebook HARQ feedback is requested. In this regard, the request for dynamic codebook HARQ feedback for the one or more PDSCH groups may alternatively be comprised in the DCI of step 406.

Whether due to the HARQ-ACK timing or due to a request, the WCD 312 generates dynamic codebook HARQ feedback for the PDSCH group(s) including the PDSCH group of the PDSCH transmission of step 408 (step 420) and sends the generated HARQ feedback to the base station 302 (step 422). The base station 302 processes the HARQ feedback and, e.g., transmits any needed re-transmissions (step 424).

Figure 5:
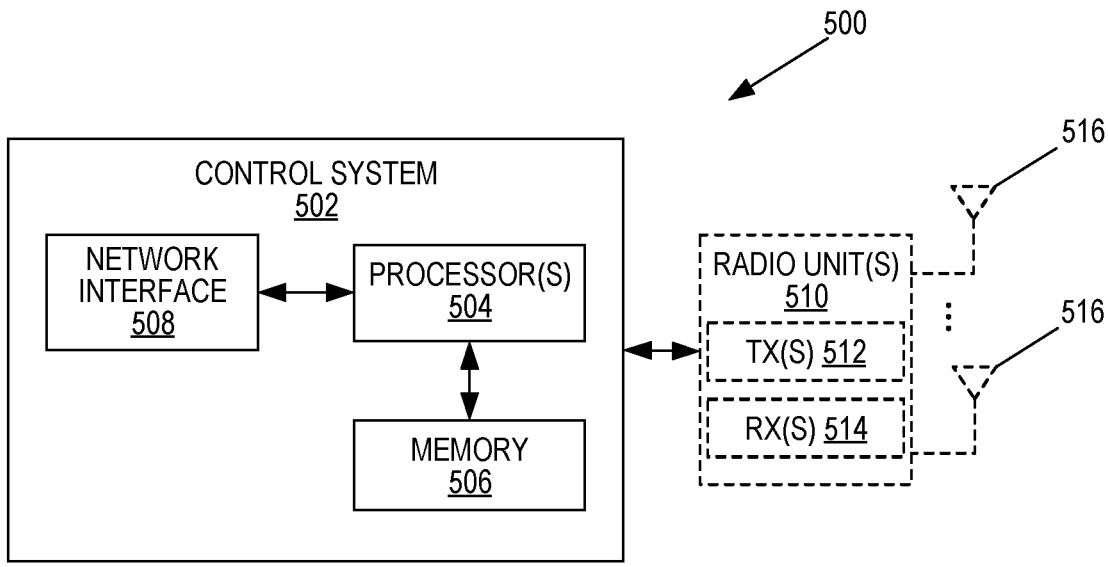
FIGS. 5 through 7 are schematic block diagrams of example embodiments of a radio access node.

FIG. 5 is a schematic block diagram of a radio access node 500 according to some embodiments of the present disclosure. Optional features are represented by dashed boxes. The radio access node 500 may be, for example, a base station 302 or 306 or a network node that implements all or part of the functionality of the base station 302 or gNB described herein. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 may include one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a radio access node 500 as described herein. In some embodiments, the function(s) are implemented in software that is stored, e.g., in the memory 506 and executed by the one or more processors 504.

Figure 6:
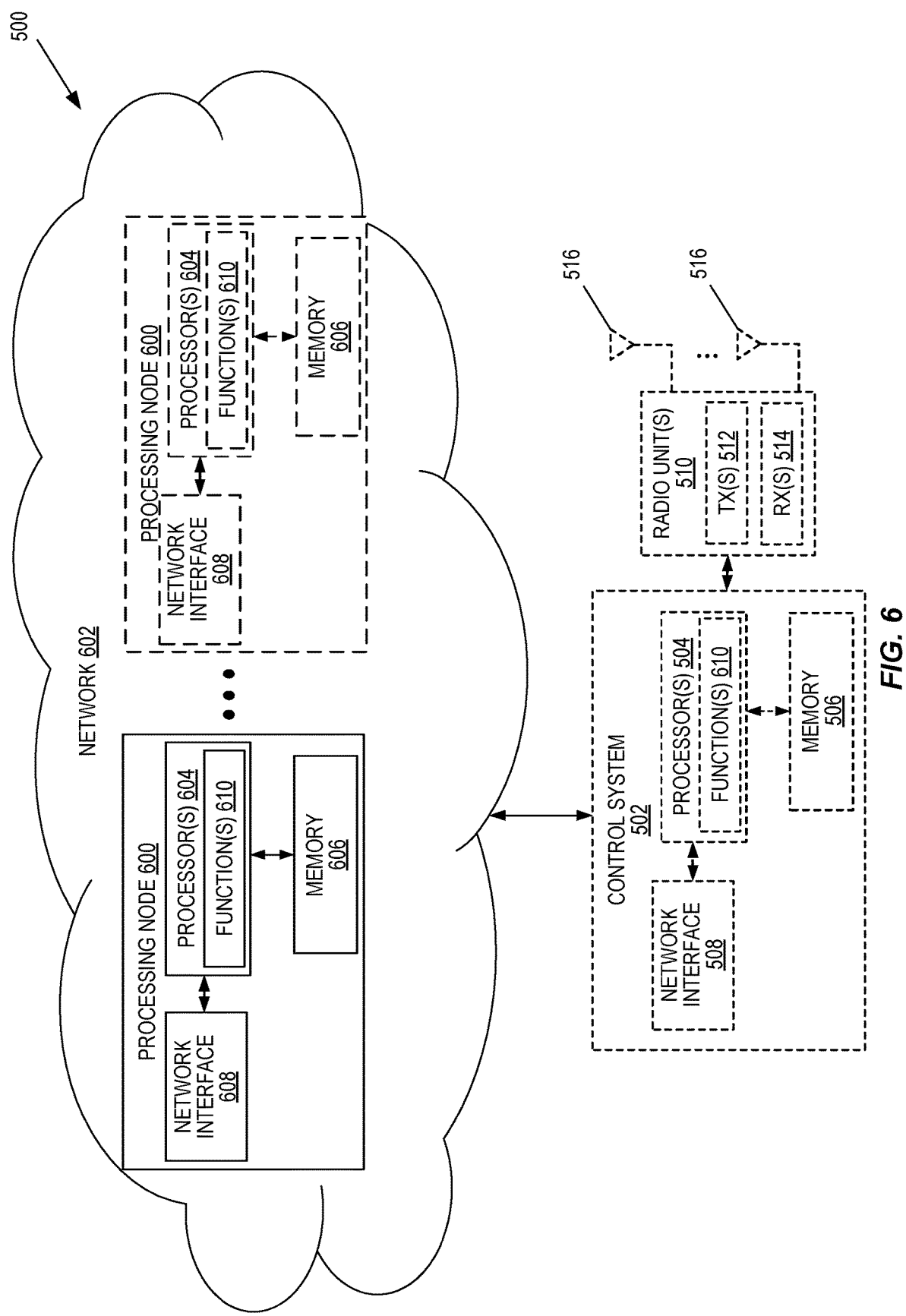

FIG. 6 is a schematic block diagram that illustrates a virtualized embodiment of the radio access node 500 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 may include the control system 502 and/or the one or more radio units 510, as described above. The control system 502 may be connected to the radio unit(s) 510 via, for example, an optical cable or the like. The radio access node 500 includes one or more processing nodes 600 coupled to or included as part of a network(s) 602. If present, the control system 502 or the radio unit(s) are connected to the processing node(s) 600 via the network 602. Each processing node 600 includes one or more processors 604 (e.g., CPUs, ASICs, FPGAs, and/or the like), memory 606, and a network interface 608.

In this example, functions 610 of the radio access node 500 described herein are implemented at the one or more processing nodes 600 or distributed across the one or more processing nodes 600 and the control system 502 and/or the radio unit(s) 510 in any desired manner. In some particular embodiments, some or all of the functions 610 of the radio access node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of radio access node 500 or a node (e.g., a processing node 600) implementing one or more of the functions 610 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
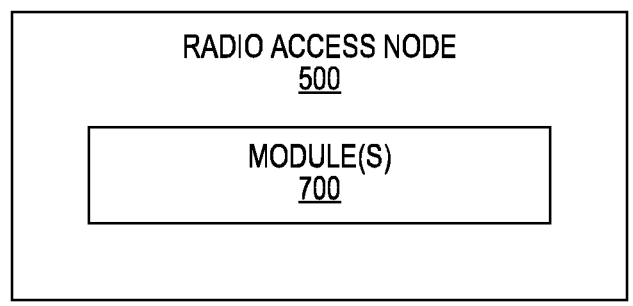

FIG. 7 is a schematic block diagram of the radio access node 500 according to some other embodiments of the present disclosure. The radio access node 500 includes one or more modules 700, each of which is implemented in software. The module(s) 700 provide the functionality of the radio access node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
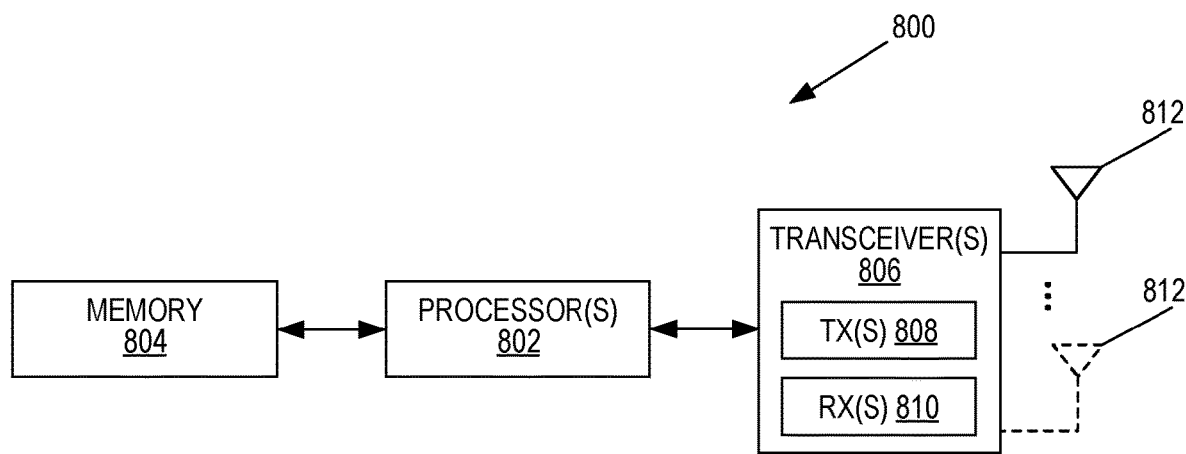
FIGS. 8 and 9 are schematic block diagrams of example embodiments of a wireless communication device or User Equipment (UE)

FIG. 8 is a schematic block diagram of a wireless communication device 800 according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
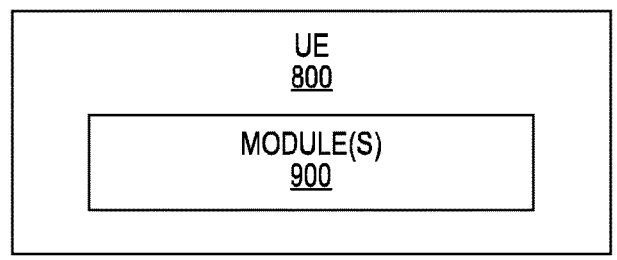

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Figure 10:
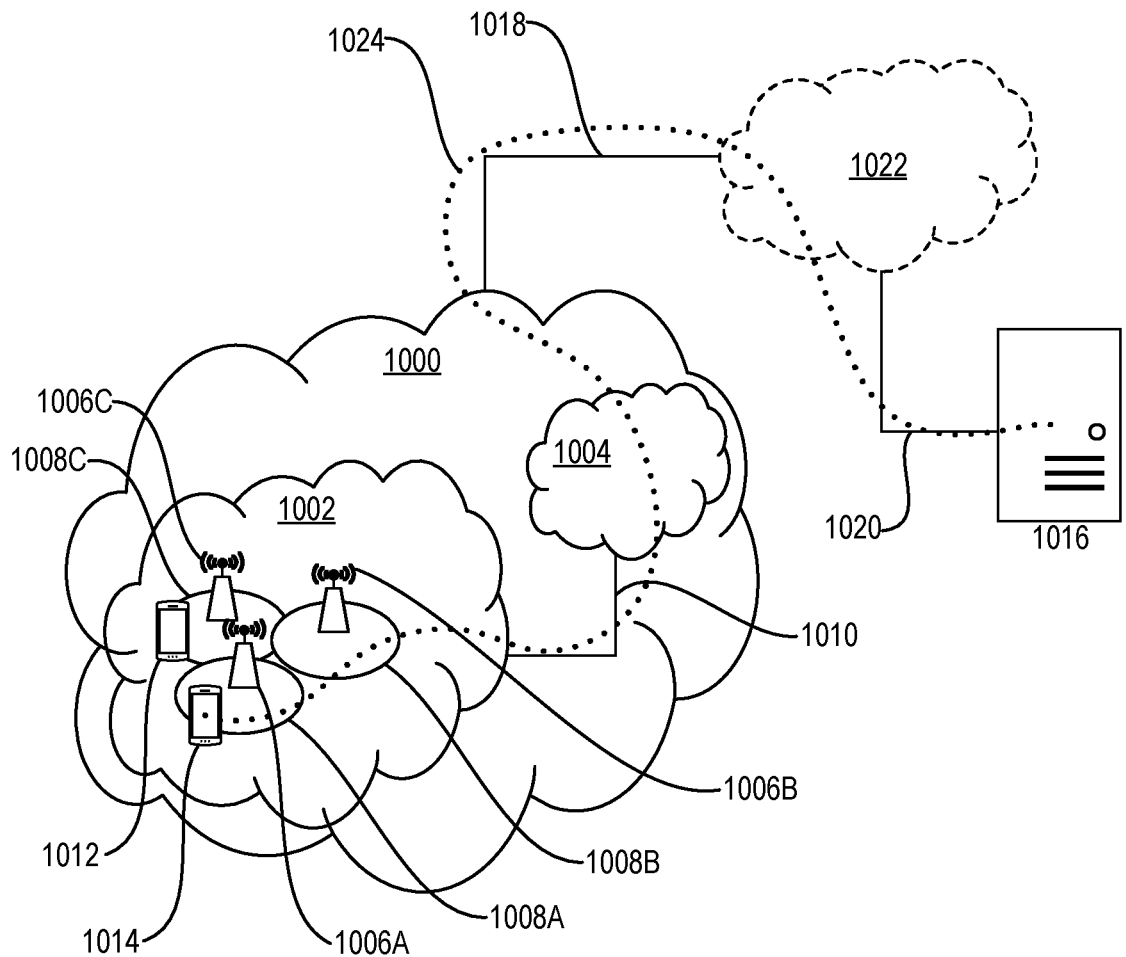
FIG. 10 illustrates an example embodiment of a communication system in which embodiments of the present disclosure may be implemented.

With reference to FIG. 10, in accordance with an embodiment, a communication system includes a telecommunication network 1000, such as a 3GPP-type cellular network, which comprises an access network 1002, such as a RAN, and a core network 1004. The access network 1002 comprises a plurality of base stations 1006A, 1006B, 1006C, such as Node Bs, eNBs, gNBs, or other types of wireless Access Points (APs), each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of uplink and downlink communications. For example, the base station 1006 may not or need not be informed about the past routing of an incoming downlink communication with data originating from the host computer 1016 to be forwarded (e.g., handed over) to a connected UE 1012. Similarly, the base station 1006 need not be aware of the future routing of an outgoing uplink communication originating from the UE 1012 towards the host computer 1016.

Example implementations, in accordance with an embodiment, of the UE, base station, and host computer discussed in the preceding paragraphs will now be described with reference to FIG. 11. In a communication system 1100, a host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a base station 1118 provided in a telecommunication system and comprising hardware 1120 enabling it to communicate with the host computer 1102 and with the UE 1114. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the base station 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the base station 1118 further includes processing circuitry 1130, which may comprise one or more programmable processors, ASICs, FPGAs, or combinations of these (not shown) adapted to execute instructions. The base station 1118 further has software 1132 stored internally or accessible via an external connection.

The communication system 1100 further includes the UE 1114 already referred to. The UE's 1114 hardware 1134 may include a radio interface 1136 configured to set up and maintain a wireless connection 1126 with a base station serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

Figure 11:
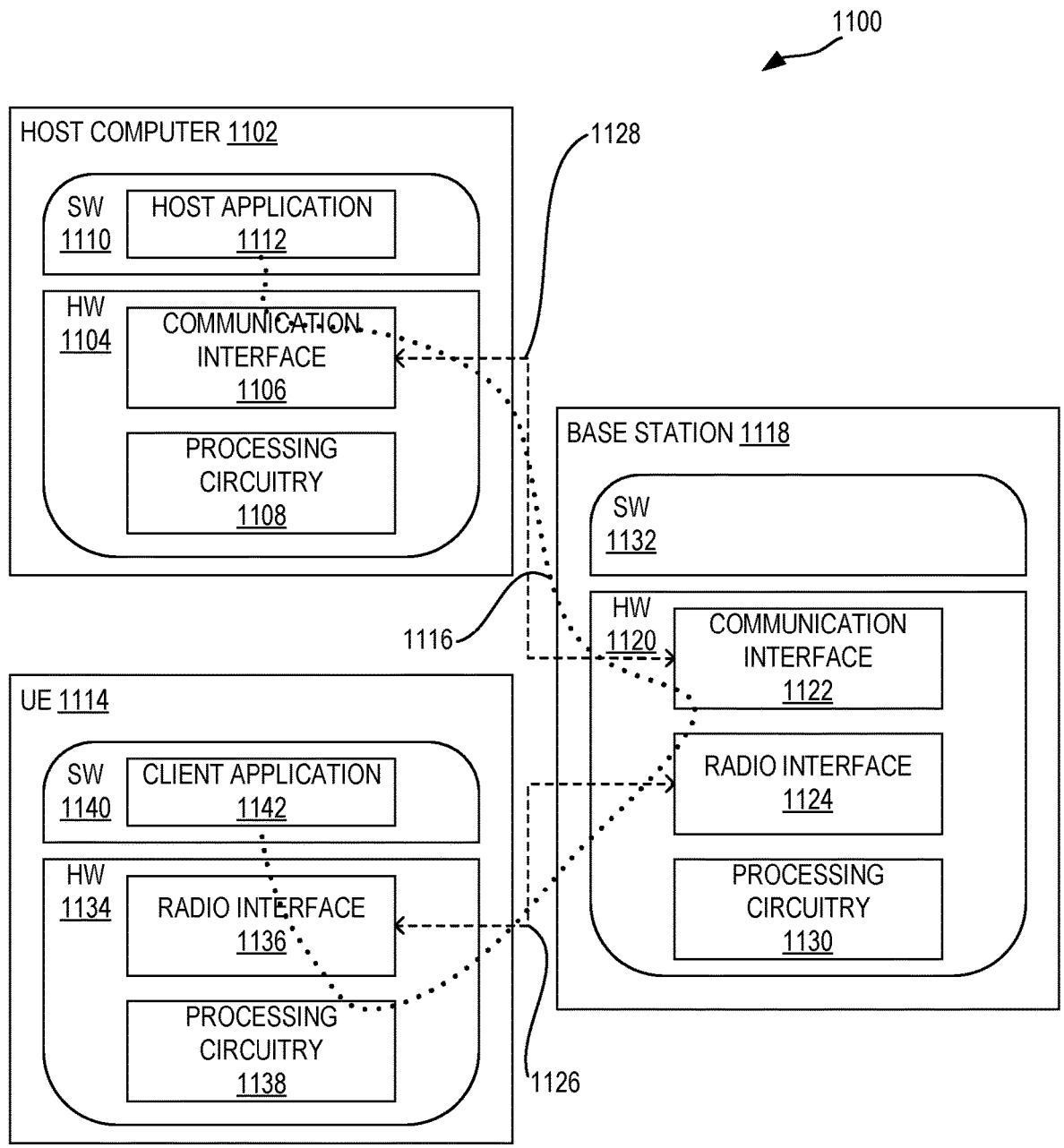
FIG. 11 illustrates example embodiments of the host computer, base station, and UE of FIG. 10.

It is noted that the host computer 1102, the base station 1118, and the UE 1114 illustrated in FIG. 11 may be similar or identical to the host computer 1016, one of the base stations 1006A, 1006B, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the base station 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further take decisions by which it dynamically changes the routing (e.g., on the basis of load balancing consideration or reconfiguration of the network).

The wireless connection 1126 between the UE 1114 and the base station 1118 is in accordance with the teachings of the embodiments described throughout this disclosure. One or more of the various embodiments improve the performance of OTT services provided to the UE 1114 using the OTT connection 1116, in which the wireless connection 1126 forms the last segment.

A measurement procedure may be provided for the purpose of monitoring data rate, latency, and other factors on which the one or more embodiments improve. There may further be an optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the base station 1118, and it may be unknown or imperceptible to the base station 1118. Such procedures and functionalities may be known and practiced in the art. In certain embodiments, measurements may involve proprietary UE signaling facilitating the host computer 1102's measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

FIG. 12 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 12 will be included in this section. In step 1200, the host computer provides user data. In sub-step 1202 (which may be optional) of step 1200, the host computer provides the user data by executing a host application. In step 1204, the host computer initiates a transmission carrying the user data to the UE. In step 1206 (which may be optional), the base station transmits to the UE the user data which was carried in the transmission that the host computer initiated, in accordance with the teachings of the embodiments described throughout this disclosure. In step 1208 (which may also be optional), the UE executes a client application associated with the host application executed by the host computer.

FIG. 13 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 13 will be included in this section. In step 1300 of the method, the host computer provides user data. In an optional sub-step (not shown) the host computer provides the user data by executing a host application. In step 1302, the host computer initiates a transmission carrying the user data to the UE. The transmission may pass via the base station, in accordance with the teachings of the embodiments described throughout this disclosure. In step 1304 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (312) for dynamic codebook Hybrid Automatic Repeat Request, HARQ, feedback, the method comprising one or more of the following actions:
 receiving (406), from a base station (302), a first downlink control information, DCI, in accordance with a DCI format, wherein:
  the first DCI comprises first downlink scheduling information for a first downlink data channel transmission to the wireless communication device (312); and
  the DCI format is either:
   a DCI format that does not include a downlink data channel group identifier; or
   a fallback DCI format that includes a downlink data channel group identifier;
 decoding (410) the first DCI;
 attempting (408, 412) to receive and decode the first downlink data channel transmission from the base station (302) in accordance with the first DCI;
 determining (414) a downlink data channel group for the first downlink data channel transmission;
 generating (420) dynamic codebook HARQ feedback for the downlink data channel group, the dynamic codebook HARQ feedback comprising HARQ feedback for the first downlink data channel transmission; and
 transmitting (422) the dynamic codebook HARQ feedback to the base station (302).

Embodiment 2: The method of embodiment 1 wherein the DCI format is a fallback DCI format that includes a downlink data channel group identifier for the first downlink data channel transmission.

Embodiment 3: The method of embodiment 2 wherein the fallback DCI format is DCI format 1_0.

Embodiment 4: The method of any of embodiments 2 to 3 wherein determining (414) the downlink data channel group for the first downlink data channel transmission comprises obtaining the downlink data channel group identifier for the first downlink data channel transmission from the first DCI.

Embodiment 5: The method of embodiment 1 wherein the DCI format is a fallback DCI format, and determining (414) the downlink data channel group for the first downlink data channel transmission comprises determining (414) that the downlink data channel group is an implicit group for downlink data channel group transmissions scheduled via DCI using the fallback DCI format.

Embodiment 6: The method of embodiment 5 wherein the fallback DCI format is a DCI format that does not include a downlink data channel transmission group identifier and does not include a NFI.

Embodiment 7: The method of embodiment 6 wherein the fallback DCI format does not include any other enhanced dynamic codebook related fields.

Embodiment 8: The method of embodiment 5 wherein the fallback DCI format comprises a NFI.

Embodiment 9: The method of embodiment 1 wherein the DCI format is a DCI format that does not include a downlink data channel group identifier.

Embodiment 10: The method of embodiment 9 wherein the DCI format is a fallback DCI format.

Embodiment 11: The method of embodiment 10 wherein the DCI format is DCI format 1_0.

Embodiment 12: The method of any of embodiments 10 to 11 wherein determining (414) the downlink data channel group for the first downlink data channel transmission comprises determining (414) that the downlink data channel group is a predefined group (e.g., a predefined group for downlink data channel group transmissions scheduled via DCI using the fallback DCI format).

Embodiment 13: The method of any of embodiments 10 to 11 wherein determining (414) the downlink data channel group for the first downlink data channel transmission comprises determining (414) that the downlink data channel group is a preconfigured group (e.g., a preconfigured group for downlink data channel group transmissions scheduled via DCI using the fallback DCI format).

Embodiment 14: The method of any of embodiments 9 to 11 wherein determining (414) the downlink data channel group for the first downlink data channel transmission comprises determining (414) that the downlink data channel group is a group to which downlink data channel transmissions that have the same data to HARQ-ACK timing are assigned.

Embodiment 15: The method of any of embodiments 10 to 11 wherein determining (414) the downlink data channel group for the first downlink data channel transmission comprises determining (414) that the downlink data channel group is a group to which downlink data channel transmissions that have the same data to HARQ-ACK timing and are scheduled by DCI having the fallback DCI format are assigned.

Embodiment 16: The method of any of embodiments 9 to 11 wherein determining (414) the downlink data channel group for the first downlink data channel transmission comprises determining (414) the downlink data channel group based on a predefined or preconfigured mapping.

Embodiment 17: The method of embodiment 16 wherein the mapping is based on time.

Embodiment 18: The method of embodiment 16 or 17 wherein the mapping is based on frequency.

Embodiment 19: The method of embodiment 16 wherein the mapping is based on RNTI.

Embodiment 20: The method of embodiment 16 wherein the mapping is based on DMRS sequence.

Embodiment 21: The method of embodiment 16 wherein the mapping is based on a search space in which the first DCI is received.

Embodiment 22: The method of any of embodiments 1 to 21 further comprising receiving (418), from the base station (302), a request for dynamic codebook HARQ feedback for one or more downlink data channel transmission groups.

Embodiment 23: The method of embodiment 22 wherein receiving (418) the request comprises receiving second DCI comprising information that indicates that dynamic codebook HARQ feedback is requested for the one or more downlink data channel transmission groups.

Embodiment 24: The method of embodiment 23 wherein the second DCI is in a DCI format that does not include downlink data channel transmission group identifiers for requested groups.

Embodiment 25: The method of embodiment 24 wherein the DCI format of the second DCI is such that the second DCI comprises DAIs that reflect a latest T-DAI for each of the one or more downlink data channel transmission groups for which dynamic codebook HARQ feedback is requested.

Embodiment 26: The method of embodiment 24 wherein the DCI format of the second DCI is such that the second DCI comprises a DAI that reflects a latest T-DAI of a latest scheduled group that is to be reported.

Embodiment 27: The method of embodiment 24 wherein the DCI format of the second DCI is such that the second DCI comprise a DAI that reflects a latest T-DAI of a latest transmitted group that is to be reported.

Embodiment 28: The method of embodiment 24 wherein the DCI format of the second DCI is such that the second DCI repurposes one or more DAI fields as an indication (e.g., a bitmap) of the one or more downlink data channel transmission groups for which dynamic codebook HARQ feedback is requested.

Embodiment 29: The method of embodiment 24 wherein the DCI format of the second DCI is such that the second DCI comprises one or more DAIs that reflect a size of the requested dynamic codebook.

Group B Embodiments

Embodiment 30: A method performed by a base station (302) for dynamic codebook Hybrid Automatic Repeat Request, HARQ, feedback, the method comprising one or more of the following actions:
- determining (402) a downlink data channel group for a first downlink data channel transmission;
- generate (404) first downlink control information, DCI, that schedules the first downlink data channel transmission to a wireless communication device (312), the first DCI being in accordance with a DCI format, wherein the DCI format is either:
  - a DCI format that does not include a downlink data channel group identifier; or
  - a fallback DCI format that includes a downlink data channel group identifier;
- transmitting or initiating transmission of (406) the first DCI to the wireless communication device (312); and
- transmitting or initiating transmission of (408) the first downlink data channel transmission to the wireless communication device (312); and
- receiving (422), from the wireless communication device (312), dynamic codebook HARQ feedback for the downlink data channel group, the dynamic codebook HARQ feedback comprising HARQ feedback for the first downlink data channel transmission.

Embodiment 31: The method of embodiment 30 wherein the DCI format is a fallback DCI format that includes a downlink data channel group identifier for the first downlink data channel transmission.

Embodiment 32: The method of embodiment 31 wherein the fallback DCI format is DCI format 1_0.

Embodiment 33: The method of any of embodiments 31 to 32 wherein the first DCI comprises a downlink data channel group identifier for the first downlink data channel transmission.

Embodiment 34: The method of embodiment 30 wherein the DCI format is a fallback DCI format, and determining (402) the downlink data channel group for the first downlink data channel transmission comprises determining (402) that the downlink data channel group is an implicit group for downlink data channel group transmissions scheduled via DCI using the fallback DCI format.

Embodiment 35: The method of embodiment 34 wherein the fallback DCI format is a DCI format that does not include a downlink data channel transmission group identifier and does not include a NFI.

Embodiment 36: The method of embodiment 35 wherein the fallback DCI format does not include any other enhanced dynamic codebook related fields.

Embodiment 37: The method of embodiment 34 wherein the fallback DCI format comprises a NFI.

Embodiment 38: The method of embodiment 30 wherein the DCI format is a DCI format that does not include a downlink data channel group identifier.

Embodiment 39: The method of embodiment 38 wherein the DCI format is a fallback DCI format.

Embodiment 40: The method of embodiment 39 wherein the DCI format is DCI format 1_0.

Embodiment 41: The method of any of embodiments 39 to 40 wherein determining (402) the downlink data channel group for the first downlink data channel transmission comprises determining (402) that the downlink data channel group is a predefined group (e.g., a predefined group for downlink data channel group transmissions scheduled via DCI using the fallback DCI format).

Embodiment 42: The method of any of embodiments 39 to 40 wherein determining (402) the downlink data channel group for the first downlink data channel transmission comprises determining (402) that the downlink data channel group is a preconfigured group (e.g., a preconfigured group for downlink data channel group transmissions scheduled via DCI using the fallback DCI format).

Embodiment 43: The method of any of embodiments 38 to 40 wherein determining (402) the downlink data channel group for the first downlink data channel transmission comprises determining (402) that the downlink data channel group is a group to which downlink data channel transmissions that have the same data to HARQ-ACK timing are assigned.

Embodiment 44: The method of any of embodiments 39 to 40 wherein determining (402) the downlink data channel group for the first downlink data channel transmission comprises determining (402) that the downlink data channel group is a group to which downlink data channel transmissions that have the same data to HARQ-ACK timing and are scheduled by DCI having the fallback DCI format are assigned.

Embodiment 45: The method of any of embodiments 38 to 40 wherein determining (402) the downlink data channel group for the first downlink data channel transmission comprises determining (402) the downlink data channel group based on a predefined or preconfigured mapping.

Embodiment 46: The method of embodiment 45 wherein the mapping is based on time.

Embodiment 47: The method of embodiment 45 or 46 wherein the mapping is based on frequency.

Embodiment 48: The method of embodiment 45 wherein the mapping is based on RNTI.

Embodiment 49: The method of embodiment 45 wherein the mapping is based on DMRS sequence.

Embodiment 50: The method of embodiment 45 wherein the mapping is based on a search space in which the first DCI is received.

Embodiment 51: The method of any of embodiments 30 to 50 further comprising transmitting or initiating transmission of (418), to the wireless communication device (312), a request for dynamic codebook HARQ feedback for one or more downlink data channel transmission groups.

Embodiment 52: The method of embodiment 51 wherein transmitting or causing transmission of (418) the request comprises transmitting or causing transmission of second DCI comprising information that indicates that dynamic codebook HARQ feedback is requested for the one or more downlink data channel transmission groups.

Embodiment 53: The method of embodiment 52 wherein the second DCI is in a DCI format that does not include downlink data channel transmission group identifiers for requested groups.

Embodiment 54: The method of embodiment 53 wherein the DCI format of the second DCI is such that the second DCI comprises DAIs that reflect a latest T-DAI for each of the one or more downlink data channel transmission groups for which dynamic codebook HARQ feedback is requested.

Embodiment 55: The method of embodiment 53 wherein the DCI format of the second DCI is such that the second DCI comprises a DAI that reflects a latest T-DAI of a latest scheduled group that is to be reported.

Embodiment 56: The method of embodiment 53 wherein the DCI format of the second DCI is such that the second DCI comprises a DAI that reflects a latest T-DAI of a latest transmitted group that is to be reported.

Embodiment 57: The method of embodiment 53 wherein the DCI format of the second DCI is such that the second DCI repurposes one or more DAI fields as an indication (e.g., a bitmap) of the one or more downlink data channel transmission groups for which dynamic codebook HARQ feedback is requested.

Embodiment 58: The method of embodiment 53 wherein the DCI format of the second DCI is such that the second DCI comprises one or more DAIs that reflect a size of the requested dynamic codebook.

Embodiment 59: The method of any of the previous embodiments, further comprising: obtaining user data; and forwarding the user data to a wireless device.

Group C Embodiments

Embodiment 61: A wireless communication device comprising: processing circuitry configured to perform any of the steps of any of the Group A embodiments; and power supply circuitry configured to supply power to the wireless communication device.

Embodiment 62: A base station comprising: processing circuitry configured to perform any of the steps of any of the Group B embodiments; and power supply circuitry configured to supply power to the base station.

Embodiment 63: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 64: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 65: The communication system of the previous embodiment further including the base station.

Embodiment 66: The communication system of the previous 2 embodiments, further including the UE, wherein the UE is configured to communicate with the base station.

Embodiment 67: The communication system of the previous 3 embodiments, wherein: the processing circuitry of the host computer is configured to execute a host application, thereby providing the user data; and the UE comprises processing circuitry configured to execute a client application associated with the host application.

Embodiment 68: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 69: The method of the previous embodiment, further comprising, at the base station, transmitting the user data.

Embodiment 70: The method of the previous 2 embodiments, wherein the user data is provided at the host computer by executing a host application, the method further comprising, at the UE, executing a client application associated with the host application.

Embodiment 71: A User Equipment, UE, configured to communicate with a base station, the UE comprising a radio interface and processing circuitry configured to perform the method of the previous 3 embodiments.

Embodiment 72: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 73: The communication system of the previous embodiment, wherein the cellular network further includes a base station configured to communicate with the UE.

Embodiment 74: The communication system of the previous 2 embodiments, wherein: the processing circuitry of the host computer is configured to execute a host application, thereby providing the user data; and the UE's processing circuitry is configured to execute a client application associated with the host application.

Embodiment 75: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 76: The method of the previous embodiment, further comprising at the UE, receiving the user data from the base station.

Embodiment 77: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 78: The communication system of the previous embodiment further including the base station.

Embodiment 79: The communication system of the previous 2 embodiments, further including the UE, wherein the UE is configured to communicate with the base station.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device for dynamic codebook Hybrid Automatic Repeat Request (HARQ) feedback, the method comprising:
   receiving, from a base station, a downlink control information (DCI) in accordance with a fallback DCI format, wherein:
      the DCI comprises downlink scheduling information that indicates downlink resources allocated for a downlink data channel transmission to the wireless communication device; and
      the fallback DCI format does not include an explicit indication of a downlink data channel group identifier of a downlink data channel group of the downlink data channel transmission;
   attempting to receive and decode the downlink data channel transmission in accordance with the DCI;
   determining a downlink data channel group for the downlink data channel transmission based on the DCI;
   generating a dynamic codebook HARQ feedback for the downlink data channel group, the dynamic codebook HARQ feedback comprising HARQ feedback for the downlink data channel transmission;
   transmitting the dynamic codebook HARQ feedback to the base station; and
   receiving, from the base station, a request for dynamic codebook HARQ feedback for one or more downlink data channel groups comprising the determined downlink data channel group of the downlink data channel transmission,
   wherein receiving the request comprises receiving second DCI comprising information that indicates that dynamic codebook HARQ feedback is requested for the one or more downlink data channel groups, wherein the second DCI is in accordance with an uplink DCI format, and wherein the uplink DCI format is such that the second DCI repurposes one or more downlink assignment index (DAI) fields as an indication of the one or more downlink data channel groups for which dynamic codebook HARQ feedback is requested.

2. The method of claim 1, wherein determining the downlink data channel group for the downlink data channel transmission comprises determining the downlink data channel group based on a predefined or preconfigured mapping.

3. The method of claim 2, wherein the mapping is based on:
   time,
   frequency,
   Radio Network Temporary Identifier (RNTI),
   Demodulation Reference Signal (DMRS) sequence, or
   a search space in which the DCI is received.

4. The method of claim 1, wherein the uplink DCI format is such that the second DCI comprises downlink assignment indices that reflect a latest total downlink assignment index (T-DAI) for each of the one or more downlink data channel groups for which dynamic codebook HARQ feedback is requested.

5. The method of claim 1, wherein the uplink DCI format is such that the second DCI comprises information that reflects a status of a latest total downlink assignment index (T-DAI) of a respective downlink channel group, wherein the uplink DCI format is such that the second DCI comprises a downlink assignment index (DAI) that reflects a latest total DAI (T-DAI) of a latest scheduled or transmitted downlink channel group that is to be reported.

6. A wireless communication device for dynamic codebook Hybrid Automatic Repeat Request (HARQ) feedback, the wireless communication device comprising:
one or more transmitters;
one or more receivers; and
processing circuitry associated with the one or more transmitters and the one or more receivers, the processing circuitry configured to cause the wireless communication device to: receive, from a base station, a downlink control information (DCI) in accordance with a fallback DCI format, wherein:
the DCI comprises downlink scheduling information that indicates downlink resources allocated for a downlink data channel transmission to the wireless communication device; and
the fallback DCI format does not include an explicit indication of a downlink data channel group identifier of a downlink data channel group of the downlink data channel transmission;
attempt to receive and decode the downlink data channel transmission in accordance with the DCI;
determine a downlink data channel group for the downlink data channel transmission based on the DCI;
generate a dynamic codebook HARQ feedback for the downlink data channel group, the dynamic codebook HARQ feedback comprising HARQ feedback for the downlink data channel transmission;
transmit the dynamic codebook HARQ feedback to the base station; and
receive, from the base station, a request for dynamic codebook HARQ feedback for one or more downlink data channel groups comprising the determined downlink data channel group of the downlink data channel transmission,
wherein receiving the request comprises receiving second DCI comprising information that indicates that dynamic codebook HARQ feedback is requested for the one or more downlink data channel groups, wherein the second DCI is in accordance with an uplink DCI format, and wherein the uplink DCI format is such that the second DCI repurposes one or more downlink assignment index (DAI) fields as an indication of the one or more downlink data channel groups for which dynamic codebook HARQ feedback is requested.

7. A method performed by a base station for dynamic codebook Hybrid Automatic Repeat Request (HARQ) feedback, the method comprising:
determining a downlink data channel group for a downlink data channel transmission;
generating downlink control information (DCI) that schedules the downlink data channel transmission to a wireless communication device, the DCI being in accordance with a fallback DCI format that does not include an explicit indication of a downlink data channel group identifier of the downlink data channel group of the downlink data channel transmission;
transmitting or initiating transmission of the DCI to the wireless communication device; and
transmitting or initiating transmission of a request to the wireless communication device for dynamic codebook HARQ feedback for one or more downlink data channel groups comprising the determined downlink data channel group of the downlink data channel transmission; and
receiving, from the wireless communication device, dynamic codebook HARQ feedback for the downlink data channel group, the dynamic codebook HARQ feedback comprising HARQ feedback for the downlink data channel transmission;
wherein transmitting or initiating transmission of the request comprises transmitting or initiating transmission of second DCI comprising information that indicates that dynamic codebook HARQ feedback is requested for the one or more downlink data channel groups, wherein the second DCI is in accordance with a DCI format that does not include downlink data channel transmission group identifiers for one or more downlink data channel groups for which dynamic codebook HARQ feedback is requested, wherein the second DCI is in accordance with an uplink DCI format, and wherein the uplink DCI format is such that the second DCI repurposes one or more downlink assignment index (DAI) fields as an indication of the one or more downlink data channel groups for which dynamic codebook HARQ feedback is requested.

8. The method of claim 7, wherein the uplink DCI format is such that the second DCI comprises downlink assignment indices that reflect a latest total downlink assignment index (T-DAI) for each of the one or more downlink data channel groups for which dynamic codebook HARQ feedback is requested.

9. The method of claim 7, wherein the uplink DCI format is such that the second DCI comprises information that reflects a status of a latest total downlink assignment index (T-DAI) of a respective downlink channel group.

10. The method of claim 7, wherein the uplink DCI format is such that the second DCI comprises a downlink assignment index (DAI) that reflects a latest total DAI (T-DAI) of a latest scheduled or transmitted downlink channel group that is to be reported, wherein the uplink DCI format is such that the second DCI comprises a downlink assignment index (DAI) that reflects a latest total DAI (T-DAI) of a latest transmitted downlink channel group that is to be reported.

11. A base station for dynamic codebook Hybrid Automatic Repeat Request (HARQ) feedback, the base station comprising processing circuitry configured to cause the base station to:
determine a downlink data channel group for a downlink data channel transmission;
generate downlink control information (DCI) that schedules the downlink data channel transmission to a wireless communication device, the DCI being in accordance with a fallback DCI format that does not include an explicit indication of a downlink data channel group identifier of the downlink data channel group of the downlink data channel transmission;
transmit or initiate transmission of the DCI to the wireless communication device; and
transmit or initiate transmission of a request to the wireless communication device for dynamic codebook HARQ feedback for one or more downlink data channel groups comprising the determined downlink data channel group of the downlink data channel transmission; and receive, from the wireless communication device, dynamic codebook HARQ feedback for the downlink data channel group, the dynamic codebook HARQ feedback comprising HARQ feedback for the downlink data channel transmission, wherein transmitting or initiating transmission of the request comprises transmitting or initiating transmission of second DCI comprising information that indicates that dynamic codebook HARQ feedback is requested for the one or more downlink data channel groups, wherein the second DCI is in accordance with a DCI format that does not include downlink data channel transmission group identifiers for one or more downlink data channel groups for which dynamic codebook HARQ feedback is requested, wherein the second DCI is in accordance with an uplink DCI format, and wherein the uplink DCI format is such that the second DCI repurposes one or more downlink assignment index (DAI) fields as an indication of the one or more downlink data channel groups for which dynamic codebook HARQ feedback is requested.

* * * * *